United States Patent
Iwasaki

(10) Patent No.: US 8,477,260 B2
(45) Date of Patent: Jul. 2, 2013

(54) LIGHT GUIDE PLATE

(75) Inventor: Osamu Iwasaki, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 352 days.

(21) Appl. No.: 12/801,565

(22) Filed: Jun. 15, 2010

(65) Prior Publication Data
US 2010/0246208 A1 Sep. 30, 2010

Related U.S. Application Data

(63) Continuation-in-part of application No. 12/659,995, filed on Mar. 26, 2010, now abandoned.

(30) Foreign Application Priority Data

Mar. 31, 2009 (JP) .................................. 2009-087216
Jan. 6, 2010 (JP) .................................. 2010-001202

(51) Int. Cl.
*G02F 1/1335* (2006.01)
(52) U.S. Cl.
USPC ............................................ 349/65; 362/616
(58) Field of Classification Search
None
See application file for complete search history.

(56) References Cited

U.S. PATENT DOCUMENTS

| 5,966,192 A | 10/1999 | Higuchi et al. |
| 5,993,020 A | 11/1999 | Koike |
| 6,217,184 B1 | 4/2001 | Koike et al. |
| 2009/0103327 A1* | 4/2009 | Iwasaki et al. ................ 362/617 |

FOREIGN PATENT DOCUMENTS

| JP | 7-36037 | 2/1995 |
| JP | 8-248233 | 9/1996 |
| JP | 8-271739 | 10/1996 |
| JP | 11-153963 | 6/1999 |
| JP | 2003-90919 | 3/2003 |
| JP | 2004-171948 | 6/2004 |
| JP | 2005-108676 | 4/2005 |
| JP | 2005-302322 | 10/2005 |

* cited by examiner

*Primary Examiner* — Sarah Hahm
(74) *Attorney, Agent, or Firm* — Jean C. Edwards, Esq.; Edwards Neils PLLC

(57) ABSTRACT

A light guide plate comprises: a rectangular light exit plane and at least one light entrance plane in contact with the light exit plane, wherein the light guide plate comprises three or more structural layers disposed on each other in a direction normal to the light exit plane, each structural layer containing scattering particles dispersed therein, the structural layers having different particle densities of scattering particles.

10 Claims, 10 Drawing Sheets

LIGHT GUIDE PLATE

CROSS REFERENCE TO A RELATED APPLICATION

This application is a continuation-in-part of U.S. Nonprovisional patent application Ser. No. 12/659,995, filed Mar. 26, 2010 entitled "LIGHT GUIDE PLATE", which claims priority from Japanese Patent Application No. 2009-087216, filed Mar. 31, 2009, and Japanese Patent Application No. 2010-001202, filed Jan. 6, 2010. The contents of all of these applications are herein incorporated by reference in their entirety.

BACKGROUND OF THE INVENTION

The present invention relates to a light guide plate used for liquid crystal display devices and the like.

Liquid crystal display devices use a backlight unit (planar lighting device) for radiating light from behind the liquid crystal display panel to illuminate the liquid crystal display panel. A backlight unit is configured using a light guide plate for diffusing light emitted by an illumination light source to irradiate the liquid crystal display panel and optical parts such as a prism sheet and a diffusion sheet for rendering the light emitted from the light guide plate uniform.

Currently, large liquid crystal televisions predominantly use a direct illumination type backlight unit that comprises a light guide plate disposed above an illumination light source. This type of backlight unit comprises a plurality of cold cathode tubes serving as a light source provided behind the liquid crystal display panel whereas the inside of the backlight unit provides white reflection surfaces to ensure uniform light amount distribution and necessary luminance.

To achieve a uniform light amount distribution with a direct illumination type backlight unit, however, a thickness of about 30 mm in a direction normal to the liquid crystal display panel is required, making further reduction of thickness of the backlight unit difficult using the direct illumination type backlight unit.

Among backlight units that allow reduction of thickness thereof, on the other hand, is a backlight unit using a light guide plate in which light emitted by an illumination light source and entering the light guide plate is guided in given directions and emitted through a light exit plane that is different from the plane through which light enters.

There has been proposed a backlight unit of a type using a light guide plate in the form of a plate containing scattering particles for diffusing light mixed therein and formed into a transparent resin, whereby light is admitted through the lateral faces of the plate and allowed to exit through the top surface.

JP 07-36037 A, for example, discloses a light diffusion light guide light source device comprising a light diffusion light guide member having at least one light entrance plane region and at least one light exit plane region and light source means for admitting light through the light entrance plane region, the light diffusion light guide member having a region that has a tendency to decrease in thickness with the increasing distance from the light entrance plane. JP 07-36037 A, for example, discloses a light diffusion light guide light source device comprising a light diffusion light guide member having at least one light entrance plane region and at least one light exit plane region and light source means for admitting light through the light entrance plane region, the light diffusion light guide member having a region that has a tendency to decrease in thickness with the increasing distance from the light entrance plane.

JP 08-248233 A discloses a planar light source device comprising a light diffusion light guide member, a prism sheet provided on the side of the light diffusion light guide member closer to a light exit plane, and a reflector provided on the rear side of the light diffusion light guide member. JP 08-248233 A discloses a planar light source device comprising a light diffusion light guide member, a prism sheet provided on the side of the light diffusion light guide member closer to a light exit plane, and a reflector provided on the rear side of the light diffusion light guide member. JP 08-271739 A discloses a liquid crystal display comprising a light emission direction correcting element formed of sheet optical materials provided with a light entrance plane having a repeated undulate pattern of prism arrays and a light exit plane given a light diffusing property. JP 11-153963 A discloses a light source device comprising a light diffusion light guide member having a scattering power therein and light supply means for supplying light through an end face of the light diffusion light guide member.

Also proposed in addition to the above light guide plates are a light guide plate having a greater thickness at the center thereof than at an end thereof at which light is admitted and at the opposite end; a light guide plate having a reflection plane inclined in such a direction that the thickness of the light guide plate increases with the increasing distance from a part of the light guide plate at which light is admitted; and a light guide plate having a configuration such that the distance between the front and rear plane is smallest at a location at which light is admitted and that the thickness of the light guide plate is greatest at a greatest distance from the location at which light is admitted (See, for example, JP 2003-90919 A, JP 2004-171948 A, JP 2005-108676 A, and JP 2005-302322 A). Also proposed in addition to the above light guide plates are a light guide plate having a greater thickness at the center thereof than at an end thereof at which light is admitted and the opposite end, a light guide plate having a reflection plane inclined in such a direction that the thickness of the light guide plate increases with the increasing distance from a part of the light guide plate at which light is admitted, and a light guide plate having a configuration such that the thickness of the light guide plate is greatest at a greatest distance from the location at which light is admitted (See, for example, JP 2003-90919 A, JP 2004-171948 A, JP 2005-108676 A, and JP 2005-302322 A).

While a thin design may be achieved with a tandem type backlight, for example, using a light guide plate of which the thickness decreases with the increasing distance from the light source, such a backlight unit yielded lower light use efficiency than the direct illumination type backlight unit because of the relative dimensions of the cold cathode tube to the reflector. Further, where the light guide plate used is shaped to have grooves for receiving cold cathode tubes, although such a light guide plate could be shaped to have a thickness that decreases with the increasing distance from the cold cathode tube, luminance at locations above the cold cathode tube disposed in the grooves increased if the light guide plate is made thinner, thus causing uneven luminance on the light exit plane to stand out. In addition, all these light guide plates posed another problem: a complex configuration leading to increased machining costs. Thus, a light guide plate of any of such types adapted to be used for a backlight unit for a large liquid crystal television having a screen size of say 37 inches or larger, in particular 50 inches or larger, was considerably expensive.

JP 2003-90919 A, JP 2004-171948 A, JP 2005-108676 A, and JP 2005-302322 A propose light guide plates growing thicker with the increasing distance from the light entrance plane to achieve stabler manufacturing or to limit luminance unevenness (unevenness in light amount) using multiple reflection. These light guide plates, made of a transparent material, allow light admitted from the light source to pass and leak through the opposite end and therefore need to be provided with prisms or dot patterns on the light reflection surface thereof.

Also proposed is a method whereby the light guide plate is provided with a reflection member near its light entrance plane on the opposite side from the light entrance plane to cause admitted light to undergo multiple reflection before allowing the light to exit through the light exit plane. To achieve a large light exit plane with these light guide plates by this method, however, the light guide plate needs to have an increased thickness, which increases weight and costs. Further, the light sources are projected into the light guide plate and perceived as such to cause uneven luminance and/or uneven illuminance.

On the other hand, the side light type backlight unit using a flat light guide plate contains fine scattering particles dispersed therein in order to efficiently emit admitted light through the light exit plane. Although such a flat light guide plate may be capable of securing a light use efficiency of 83% at a particle density of 0.30 wt %, its luminance dropped in an area about the center as illustrated by the illuminance distribution indicated by a solid line in FIG. 15 when it was adapted to provide a larger screen despite scattering particles evenly dispersed therein, thus allowing uneven luminance to stand out to a visible level.

To even out such uneven luminance, the density of the scattering particles needed to be reduced in order to increase the amount of light leaking from the area about the center, thus reducing the light use efficiency and the luminance. For example, when the density of the scattering particles was 0.10 wt %, with the other conditions being equal, the luminance decreased and the light use efficiency lowered to 43%, although uneven luminance could be evened out considerably, as illustrated by a dotted line in FIG. 15.

A large display such as a large liquid crystal television is required to present a luminance distribution on the light exit plane that is bright in an area close to the center of the screen as compared with the periphery (edges) thereof, i.e., a convex curve distribution such as a distribution representing a bell curve. Although a flat light guide plate containing scattering particles dispersed therein may be capable of providing a flat luminance distribution by reducing the density of the scattering particles, it is incapable of achieving a convex luminance distribution.

It has also been proposed to use a light guide plate having a thickness that, conversely to the tandem type, increases with the increasing distance from the light source for a thin backlight unit. Although use of such a light guide plate does achieve a thinner design and a flat luminance over the whole screen, such a proposal did not provide any teaching or did not give the slightest consideration as to how one may achieve a convex luminance distribution whereby an area close to the center of the screen is brighter than the periphery thereof as required of thin, large-screen liquid crystal televisions.

Further, although there has been a demand for a yet thinner design in a large display such as a large-screen liquid crystal television, there has not been made any proposal nor has any teaching been provided as to how one may achieve emission of light with a high light use efficiency, a reduced level of unevenness in luminance, and a convex luminance distribution with a thickness comparable to that of a sheet light guide plate or a so-called light guide sheet.

SUMMARY OF THE INVENTION

An object of the present invention is to provide a large and thin light guide plate yielding a high light use efficiency, capable of emitting light with a minimized unevenness in luminance and achieving a convex or bell-curve luminance distribution such that a central area of the screen is brighter than the periphery, thereby overcoming the problems associated with the prior art described above.

A light guide plate according to the invention comprises: a rectangular light exit plane and at least one light entrance plane connected with the light exit plane, wherein the light guide plate comprises three or more structural layers disposed on each other in a direction normal to the light exit plane, or one layer not containing the scattering particles and two or more layers having different particle densities of scattering particles.

DETAILED DESCRIPTION OF THE INVENTION

Now, the light guide plate according to the invention will be described in detail referring to the preferred embodiments illustrated in the attached drawings.

First Embodiment

Figure 1:
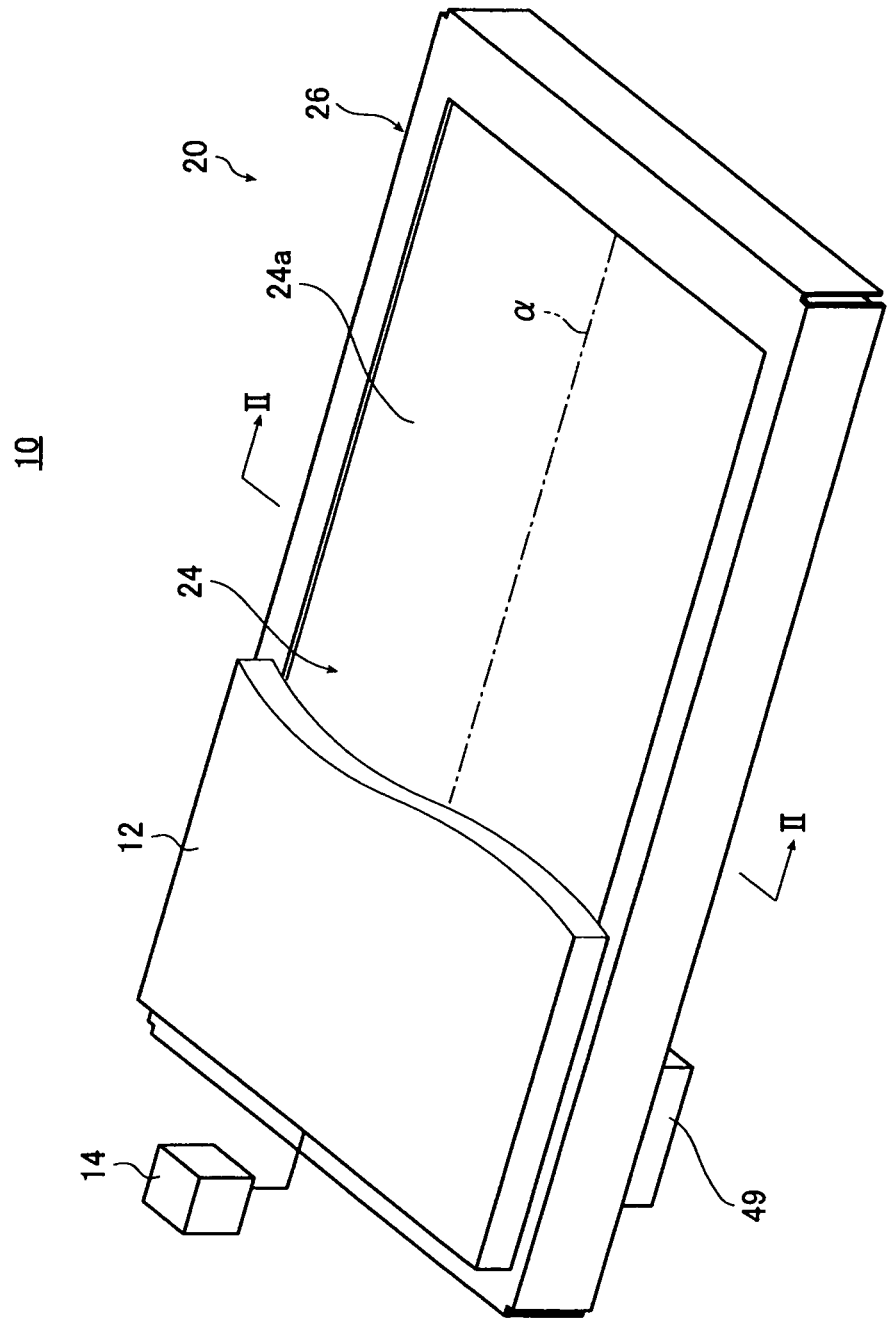
FIG. 1 is a schematic perspective view illustrating a liquid crystal display device provided with a planar lighting device (backlight unit) according to a first embodiment of the light guide plate of the invention.
Figure 2:
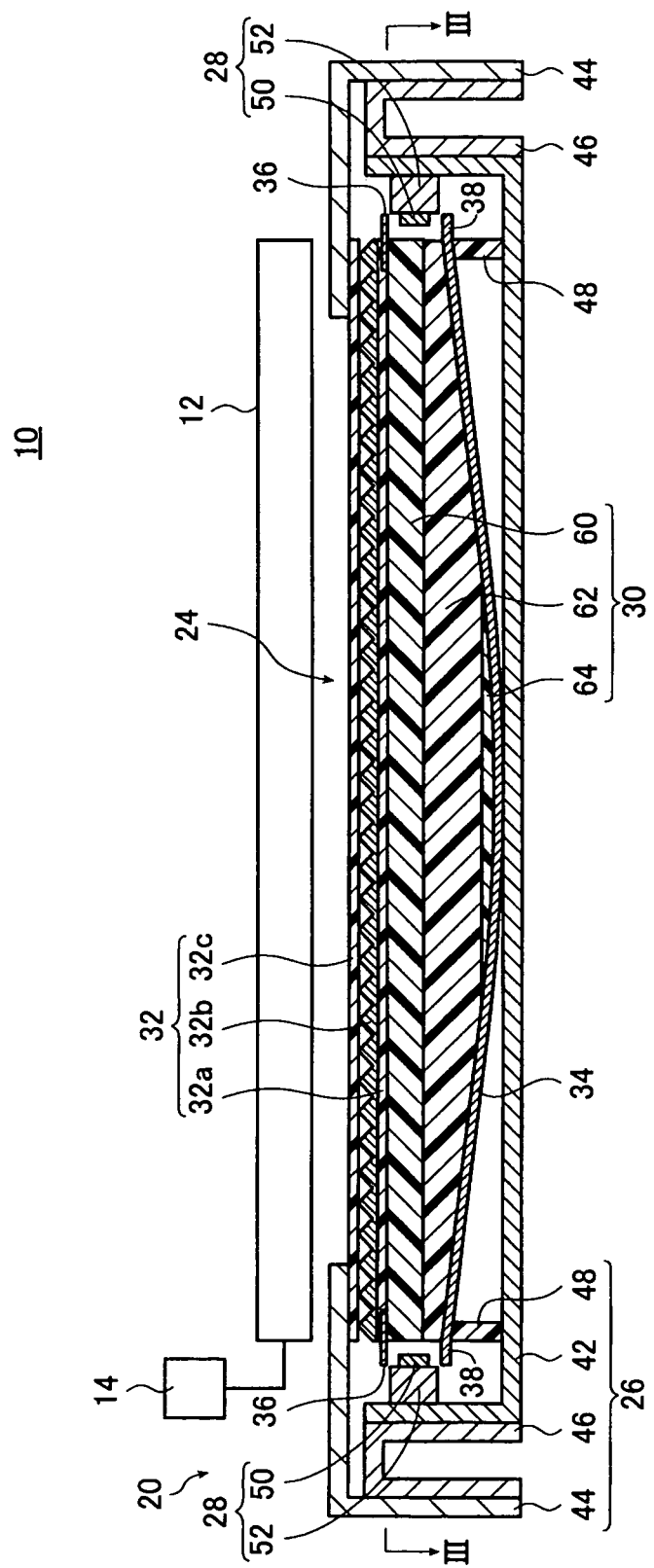
FIG. 2 is a cross sectional view illustrating an inner configuration of the liquid crystal display device illustrated of FIG. 1 taken along line II-II.

FIG. 1 is a schematic perspective view illustrating a liquid crystal display device provided with a planar lighting device using the light guide plate according to the first embodiment of the invention; FIG. 2 is a cross sectional view illustrating an inner configuration of the liquid crystal display device of FIG. 1 taken along line II-II.

Figure 3A:
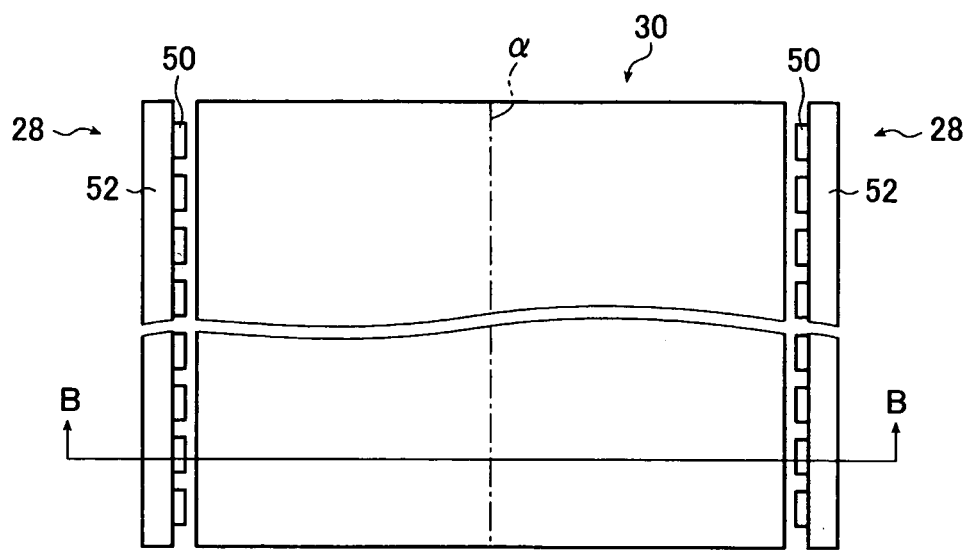
FIG. 3A is a top plan view illustrating a schematic configuration of a part of the light sources and the light guide plate of the planar lighting device of FIG. 2 taken along line III-III.
Figure 3B:
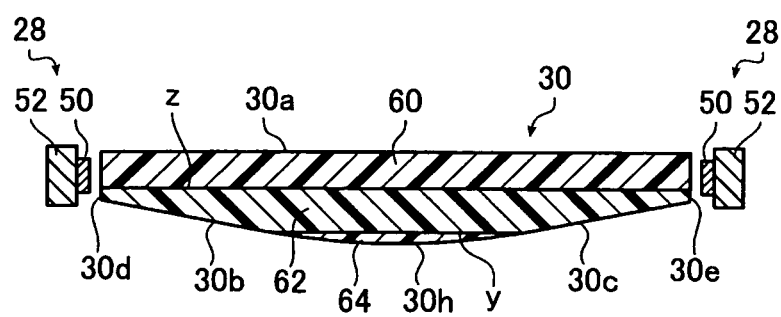
FIG. 3B is a cross sectional view of FIG. 3A taken along line B-B.

FIG. 3A is a top plan view illustrating a schematic configuration of a part of the planar lighting device (backlight unit) of FIG. 2 taken along line III-III; FIG. 3B is a cross sectional view of FIG. 3A taken along line B-B.

A liquid crystal display device 10 comprises a backlight unit 20, a liquid crystal display panel 12 disposed on the side of the backlight unit 20 closer to the light exit plane, and a drive unit 14 for driving the liquid crystal display panel 12. In FIG. 1, a part of the liquid crystal display panel 12 is not shown in order to illustrate the configuration of the backlight unit 20.

In the liquid crystal display panel 12, an electric field is partially applied to liquid crystal molecules, previously arranged in a given direction, to change the orientation of the molecules. The resultant changes in refractive index in the liquid crystal cells are used to display characters, figures, images, etc., on the liquid crystal display panel 12.

The drive unit 14 applies a voltage to transparent electrodes in the liquid crystal display panel 12 to change the orientation of the liquid crystal molecules, thereby controlling the transmittance of the light transmitted through the liquid crystal display panel 12.

The backlight unit 20 is a lighting device for illuminating the whole surface of the liquid crystal display panel 12 from behind the liquid crystal display panel 12 and comprises a light exit plane 24a having substantially a same shape as an image display surface of the liquid crystal display panel 12.

As illustrated in FIGS. 1, 2, 3A and 3B, this embodiment of the backlight unit 20 comprises a lighting device 24 and a housing 26. The lighting device 24 comprises two light sources 28, a light guide plate 30, and an optical member unit 32. The housing 26 comprises a lower housing 42, an upper housing 44, turnup members 46, and support members 48. The housing 26 comprises a lower housing 42, an upper housing 44, turnup members 46, and support members 48. As illustrated in FIG. 1, a power unit casing 49 is provided on the underside of the lower housing 42 of the housing 26 to hold power supply units that supply the light sources 28 with electrical power.

Now, component parts constituting the backlight unit 20 will be described.

As illustrated in FIG. 2, the lighting device 24 comprises the light sources 28 for emitting light, the light guide plate 30 for admitting the light emitted by the light sources 28 to produce planar light, and the optical member unit 32 for scattering and diffusing the light produced by the light guide plate 30 to obtain light with further reduced unevenness.

First, the light sources 28 will be described.

Figures 4A, 4B:
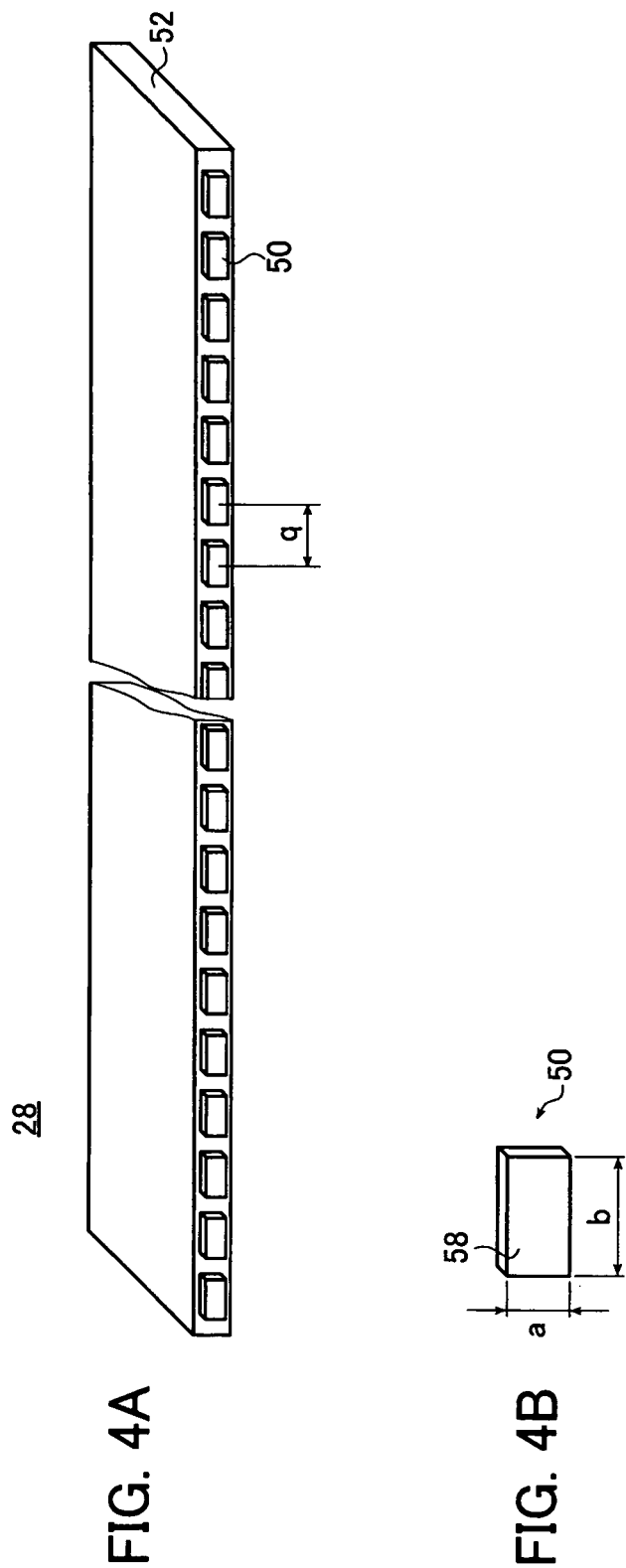
FIG. 4A is a perspective view illustrating a schematic configuration of the light source of the planar lighting device of FIG. 2.
FIG. 4B is a schematic perspective view illustrating, enlarged, a configuration of one of the LED chips forming the light source of FIG. 4A.

FIG. 4A is a perspective view schematically illustrating a configuration of a light source 28 of the backlight unit 20 of FIGS. 1 to 3; FIG. 4B is a schematic perspective view illustrating, enlarged, only one LED chip of the light source 28 of FIG. 4A.

As illustrated in FIG. 4A, the light source 28 comprises a plurality of LED chips 50 and a light source mount 52.

The LED chip 50 is a chip of a light emitting diode emitting blue light the surface of which has a fluorescent substance applied thereon. It has a light emission face 58 with a given area through which white light is emitted.

Specifically, when blue light emitted through the surface of the light emitting diode of the LED chip 50 is transmitted through the fluorescent substance, the fluorescent substance generates fluorescence. Thus, the blue light emitted by the light emitting diode and the light produced as the fluorescent substance fluoresces blend to produce white light from the LED chip 50.

The LED chip 50 may for example be formed by applying a YAGk (yttrium aluminum garnet) base fluorescent substance to the surface of a GaN base light emitting diode, an InGaN base light emitting diode, and the like.

A light source support 52 is a plate member disposed so that one surface thereof faces the light entrance plane 30d or 30e, which is a lateral end face of the light guide plate 30 at which the light guide plate 30 is thinnest.

The light source support 52 carries the LED chips 50 spaced at given intervals from each other on its lateral plane facing the light entrance plane (30d or 30e) of the light guide plate 30. Specifically, the LED chips 50 constituting the light source 28 are arrayed along the length of a first light entrance plane 30d or a second light entrance plane 30e of the light guide plate 30 to be described, that is, parallel to a line in which the first light entrance plane 30d or the second light entrance plane 30e meets a light exit plane 30a and secured to the light source support 52.

The light source support 52 is formed of a metal having a good heat conductance as exemplified by copper and aluminum and also acts as a heat sink to absorb heat generated by the LED chips 50 to release the heat to the outside. The light source support 52 may be equipped with fins to provide a larger surface area for an increased heat dissipation effect or heat pipes to transfer heat to a heat dissipation member.

As illustrated in FIG. 4B, the LED chips 50 according to this embodiment each have a rectangular shape such that the sides normal to the direction in which the LED chips 50 are arrayed are shorter than the sides lying in the direction in which the LED chips 50 are arrayed or, in other words, the sides lying in the direction of thickness of the light guide plate 30 to be described, i.e., the direction normal to the light exit plane 30a, are the shorter sides. Thus, the LED chips 50 each have a shape defined by b>a where "a" denotes the length of the side normal to the light exit plane 30a of the light guide plate 30 and "b" denotes the length of the side in the array direction. Now, let "q" be the pitch at which the LED chips 50 are arranged, then q>b holds. Thus, the length "a" of the side of the LED chips 50 normal to the light exit plane 30a of the light guide plate 30, the length "b" of the side in the array direction, and the pitch "q" at which the LED chips 50 are arranged preferably have a relationship satisfying q>b>a.

Providing the LED chips 50 each having the shape of a rectangle allows a thinner design of the light source to be achieved while producing a large amount of light. The light source 28 having a reduced thickness permits reduction of thickness of the backlight unit. Further, the number of LED chips 50 that need to be arranged may be reduced.

Although the LED chips 50 each preferably have a rectangular shape with the shorter sides lying in the direction of the thickness of the light guide plate 30 for a thinner design of the light source 28, the present invention is not limited thereto, allowing the LED chips to have any shape as appropriate such as a square, a circle, a polygon, and an ellipse.

Now, the light guide plate 30 will be described.

Figure 5:
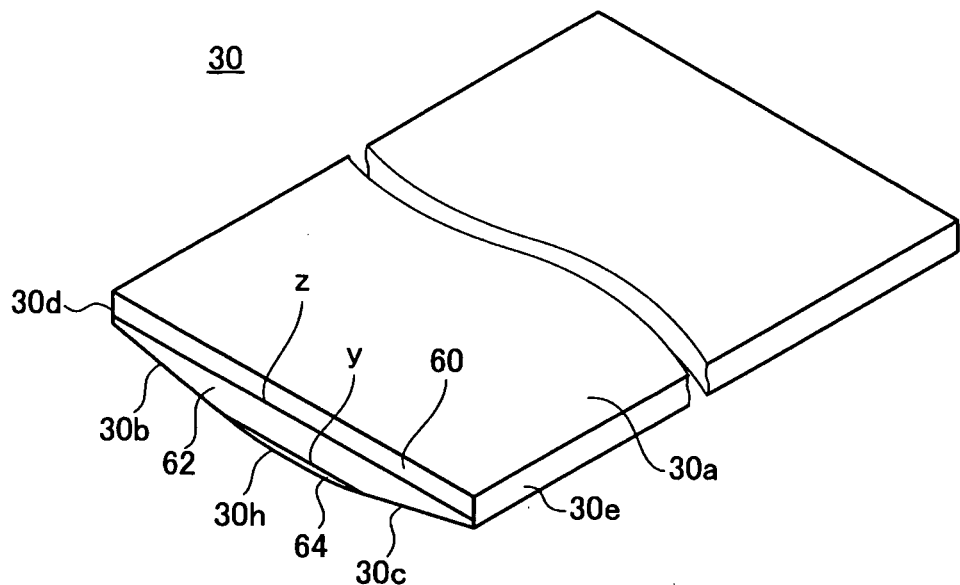
FIG. 5 is a perspective view schematically illustrating the shape of the light guide plate of FIG. 3.
Figure 15:
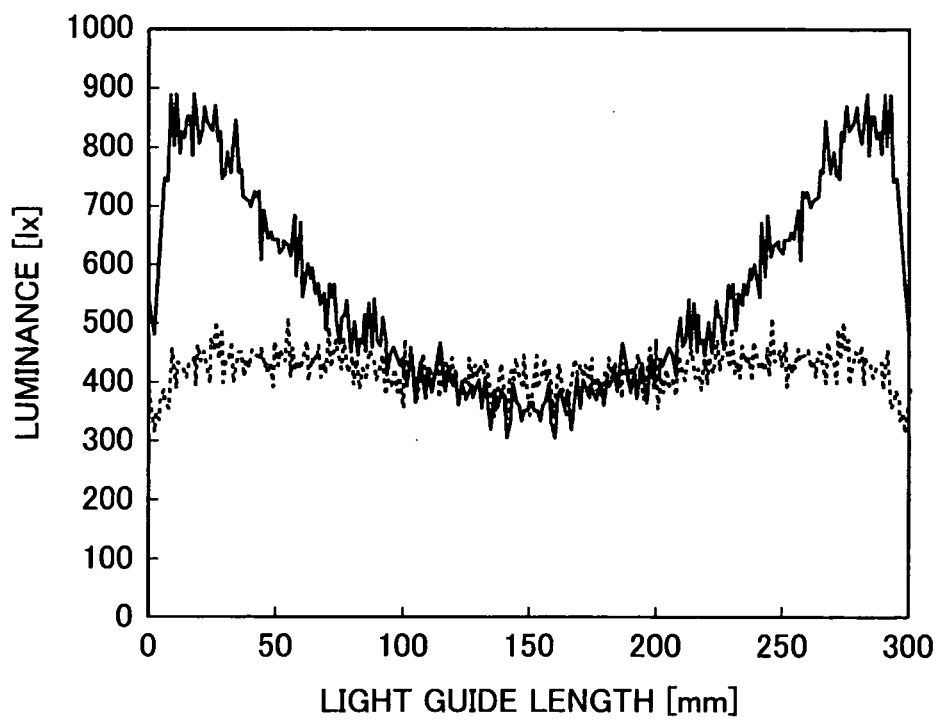
FIG. 15 is a graph illustrating a illuminance distribution of light emitted through the light exit plane of a conventional, flat light guide plate.

FIG. 5 is a perspective view schematically illustrating the shape of the light guide plate 30.

As illustrated in FIGS. 2, 3A, 3B, and 5, the light guide plate 30 comprises the rectangular light exit plane 30a; two light entrance planes, the first light entrance plane 30d and the second light entrance plane 30e formed on the two longer sides of the light exit plane 30a and substantially normal to the light exit plane 30a; two inclined planes (a first inclined plane 30b and a second inclined plane 30c) located on the opposite side from the light exit plane 30a, i.e., on the underside of the light guide plate 30 so as to be symmetrical to each other with respect to a central axis or the bisector a connecting the centers of the shorter sides of the light guide plate 30a (see FIGS. 1 and 3A) and inclined a given angle with respect to the light exit plane 30a; and a curved portion 30h having a radius of curvature R connecting the two inclined planes (the first inclined plane 30b and the second inclined plane 30c). The two inclined planes 30b, 30c connect smoothly with the curved portion 30h.

The thickness of the light guide plate 30 increases from the first light entrance plane 30d and the second light entrance plane 30e to the center so that the light guide plate 30 is thickest in a position thereof corresponding to the central bisector α and thinnest at the two light entrance planes (the first light entrance plane 30d and the second light entrance plane 30e) on both ends.

The two light sources 28 mentioned above are disposed opposite the first light entrance plane 30d and the second light entrance plane 30e of the light guide plate 30, respectively. In this embodiment, the light emission face 58 of the LED chips 50 of the light sources 28 has substantially the same length as the first light entrance plane 30d and the second light entrance plane 30e in the direction normal to the light exit plane 30a.

Thus, the backlight unit 20 has the two light sources 28 disposed so as to sandwich the light guide plate 30. In other words, the light guide plate 30 is placed between the two light sources 28 arranged opposite each other with a given distance between them.

The light guide plate 30 is formed of a transparent resin into which light scattering particles are kneaded and dispersed. Transparent resin materials that may be used to form the light guide plate 30 include optically transparent resins such as PET (polyethylene terephthalate), PP (polypropylene), PC (polycarbonate), PMMA (polymethyl methacrylate), benzyl methacrylate, MS resins, and COP (cycloolefin polymer). The scattering particles kneaded and dispersed into the light guide plate 30 may be formed, for example, of TOSPEARL (trademark), silicone, silica, zirconia, or a dielectric polymer.

As illustrated in FIG. 3B, the light guide plate 30 is formed with a three-layer structure: a first layer 60 located on the side closer to the light exit plane 30a, a third layer 64 located on the side closer to the curved portion 30h, and a second layer 62 provided between the first layer 60 and the third layer 64.

Specifically, the first layer 60 is a region having a rectangular cross section surrounded by the light exit plane 30a, a part of the first light entrance plane 30d and a part of the second light entrance plane 30e, both parts being closer to the light exit plane 30a, and a plane having its ends contained in the first light entrance plane 30d and the second light entrance plane 30e.

The second layer 62 is in contact with the first layer 60 and is surrounded by a plane having its ends contained in the first light entrance plane 30d and the second light entrance plane 30e, a part of the first light entrance plane 30d and a part of the second light entrance plane 30e, both parts being closer to the rear plane, the first inclined plane 30b and the second inclined plane 30c, and a plane connecting the ends of the first inclined plane 30b and the second inclined plane 30c closer to the curved portion 30h. Thus, the second layer 62 has a cross section formed by a rectangle and a trapezoid combined.

The third layer 64 is in contact with the second layer 62 and surrounded by the curved portion 30h and the plane connecting the ends of the first inclined plane 30b and the second inclined plane 30c closer to the curved portion 30h. Thus, the third layer 64 has an arched cross section.

Thus, the first layer 60, the second layer 62, and the third layer 64 are disposed in this order, the first layer 60 being closest to the light exit plane 30a. The first layer 60 shares an interface z with the second layer 62, and the interface z is the plane having its ends contained in the first light entrance plane 30d and the second light entrance plane 30e. The second layer 62 shares an interface y with the third layer 64, and the interface y is the plane connecting the ends of the first inclined plane 30b and the second inclined plane 30c closer to the curved portion 30h.

Although the light guide plate 30 is divided into the first layer 60, the second layer 62, and the third layer 64 by the interface z and the interface y, the first layer 60, the second layer 62, and the third layer 64 are all formed of the same transparent resin and contain the same scattering particles dispersed therein, the only difference being the density of the scattering particles. Accordingly, the light guide plate has a one-piece structure. Therefore, the light guide plate 30 has different particle densities in the respective layers separated by the interface z and the interface y but the interface z and the interface y are virtual planes so that the first layer 60, the second layer 62, and the third layer 64 are integral with each other.

Now, let $Np_1$ be the particle density of the scattering particles in the first layer 60, $Np_2$ the particle density of the scattering particles in the second layer 62, and $Np_3$ the particle density of the scattering particles in the third layer 64. Then $Np_1$, $Np_2$, and $Np_3$ have a relationship $Np_1 < Np_2 < Np_3$. Thus, the light guide plate 30 has a higher particle density of scattering particles in the layer closer to the curved portion 30h (rear plane) than in the layer closer to the light exit plane 30a.

The light guide plate 30, adapted to contain scattering particles with different densities in different regions thereof, is capable of emitting illumination light having a convex luminance distribution with a minimized unevenness in luminance and illuminance through the light exit plane 30a. The light guide plate 30 so formed may be manufactured using an extrusion molding method or an injection molding method.

The luminance distribution and the illuminance distribution of the light guide plate according to this embodiment basically share similar tendencies and so do luminance unevenness and illuminance unevenness. Thus, illuminance unevenness is also observed where luminance unevenness appears such that they share similar tendencies.

In the light guide plate 30 illustrated in FIG. 2, light emitted from the light sources 28 and entering the light guide plate 30 through the first light entrance plane 30d and the second light entrance plane 30e is scattered as it travels through the inside of the light guide plate 30 by scatterers contained inside the light guide plate 30 and exits through the light exit plane 30a directly or after being reflected by the rear plane, i.e., the first inclined plane 30b, the second inclined plane 30c, and the curved portion 30h. Although a portion of light may leak through the rear plane (the first inclined plane 30b, the second inclined plane 30c, and the curved portion 30h) at this time, the leaked light is reflected by the reflection plate 34 disposed on the side closer to the rear plane of the light guide plate 30 (the first inclined plane 30b, the second inclined plane 30c, and the curved portion h) to re-enter the light guide plate 30. The reflection plate 34 will be described later in detail.

The shape of the light guide plate 30 thus growing thicker in the direction normal to the light exit plane 30a with the increasing distance from the first light entrance plane 30d or the second light entrance plane 30e opposite which the light source 28 is disposed allows the light admitted through the light entrance planes 30d and 30e to travel farther from the light entrance planes 30d and 30e and, hence, enables a larger light exit plane 30a to be achieved. Moreover, since the light entering through the light entrance planes 30d and 30e is advantageously guided to travel a long distance, a thinner design of the light guide plate 30 is made possible.

The configuration of the light guide plate 30 having different particle densities in the first layer 60, the second layer 62, and the third layer 64, i.e., three different particle densities, such that the particle density in the first layer 60 located closer to the light exit plane 30a is lower than the particle density in the second layer 62, and the particle density in the third layer 64 located closer to the curved portion 30h (rear plane) is higher than the particle density in the second layer 62 achieves a further accentuated convex luminance distribution at the light exit plane, i.e., a luminance distribution that is brighter in an area closer to the center of the screen than at the edges thereof as represented by a bell-shape distribution, and an enhanced light use efficiency as compared with a light guide plate having a single particle density, that is, a light guide plate where particles are dispersed evenly with a uniform density throughout.

Specifically, when the relationship between the particle density $Np_1$ of the scattering particles in the first layer 60, the particle density $Np_2$ of the scattering particles in the second layer 62, and the particle density $Np_3$ of the scattering particles in the third layer 64 satisfies $Np_1 < Np_2 < Np_3$ as in this embodiment, a combined particle density of the scattering particles gradually increases from the light entrance planes 30d, 30e to the center of the two light entrance planes. Accordingly, light reflected by the effects of the scattering particles toward the light exit plane 30a increases with the increasing distance from the light entrance planes 30d, 30e, achieving an illuminance distribution with a desirable convexness ratio. In other words, similar effects can be obtained to those produced with a flat light guide plate providing a scattering particle density distribution in the optical axis direction. In addition, adjustment of the shape of the rear plane permits setting the luminance distribution (scattering particle density distribution) as desired, improving the efficiency to a maximum extent.

Note that the combined particle density herein denotes a density of scattering particles expressed using an amount of scattering particles added or combined in a direction normal to the light exit plane at a position spaced apart from one light entrance plane toward the other on the assumption that the light guide plate is a flat plate of which the thickness is a thickness at the light entrance planes throughout the light guide plate. In other words, the combined particle density denotes an amount of scattering particles in unit volume or a weight percentage of the scattering particles in relation to the base material added in a direction normal to the light exit plane at a position spaced apart from a light entrance plane on the assumption that the light guide plate is a flat plate of which the thickness is a thickness at the light entrance planes throughout the light guide plate.

Further, the light use efficiency can also be substantially as high as or higher than that obtained with a light guide plate having a single particle density. Thus, the light guide plate of the invention is capable of emitting light having an illuminance distribution and a luminance distribution representing a more accentuated convex curve than the light guide plate having a single particle density while keeping the light use efficiency substantially as high as that achieved by the light guide plate having a single particle density. In addition, since the layer closer to the light exit plane has a low particle density, the amount of the overall scattering particles used can be smaller than otherwise, leading to reduced manufacturing costs.

Further, it is preferable that the relationships between the particle density $Np_1$ of the scattering particles in the first layer 60, the particle density $Np_2$ of the scattering particles in the second layer 62, and the particle density $Np_3$ of the scattering particles in the third layer 64 satisfy $0 \text{ wt\%} < Np_1 \leqq 0.15 \text{ wt\%}$ and $0.008 \text{ wt\%} < Np_2 < Np_3 < 0.4 \text{ wt\%}$.

With the first layer 60, the second layer 62, and the third layer 64 of the light guide plate 30 satisfying the above relationships, the first layer 60 having a lower particle density guides the incoming light deep in the light guide plate 30 toward the center thereof without scattering it greatly, the admitted light being scattered the more by the second layer 62 having a higher particle density than the first layer 60, and further through the third layer 64 having a yet higher particle density than the second layer 62 as the light comes closer to the center of the light guide plate 30, thus increasing the amount of light emitted through the light exit plane 30a. In brief, an illuminance distribution representing a convex curve with a desirable proportion can be achieved while further enhancing the light use efficiency.

The particle density [wt %] herein denotes a ratio of the weight of the scattering particles to the weight of the base material.

Further, the light guide plate of the invention may comprise a layer containing no scattering particles. That is, where the light guide plate comprises three layers each having different particle densities, the particle density $Np_1$ of the first layer having the lowest particle density may be zero ($Np_1 = 0$).

It is also preferable that the relationships between the particle density $Np_1$ of the scattering particles in the first layer 60, the particle density $Np_2$ of the scattering particles in the second layer 62, and the particle density $Np_3$ of the scattering particles in the third layer 64 satisfy $Np_1 = 0 \text{ wt\%} < Np_2 < Np_3 < 0.75 \text{ wt\%}$. Thus, the first layer 60 may have no scattering particles dispersed therein so that the admitted light can be guided deep in the light guide plate 30, with the scattering particles dispersed only in the second layer 62 and the third layer 64 so that the light is scattered more as it comes closer to the center of the light guide plate, thereby increasing the amount of light emitted through the light exit plane 30a.

The first layer 60, the second layer 62, and the third layer 64 of the light guide plate adapted to satisfy the above relationships also permit achieving an illuminance distribution representing a convex curve with a desirable proportion while further enhancing the light use efficiency.

There is no specific limitation to the thickness of the light guide plate 30; for example, the light guide plate may be several millimeters in thickness like one in the form of a film or a so-called light guide sheet measuring 1 mm or less in thickness. A light guide plate in the form of a film comprising three layers each containing scattering particles with different particle densities may be produced as follows: a base film containing scattering particles is fabricated by extrusion molding or like method to provide the first layer; a monomeric resin liquid (transparent resin liquid) having scattering particles dispersed therein is applied to the base film, which base film is then irradiated with ultraviolet light or visible light to harden the monomeric resin liquid, thereby fabricating the second layer and the third layer each having desired particle densities to produce a light guide plate in the form of a film. The method of producing such a light guide sheet in the form of a film is not limited to the above method; it may be produced by fabricating three layers using extrusion molding.

When given a multilayer structure, a light guide sheet, i.e., a light guide plate in the form of a film having a thickness of 1 mm or less, also makes it possible to achieve an illuminance distribution representing a convex curve with a desirable proportion while further enhancing the light use efficiency.

Next, the optical member unit 32 will be described.

The optical member unit 32 is provided to reduce the luminance unevenness and illuminance unevenness of the illumination light emitted through the light exit plane 30a of the light guide plate 30 before emitting the light through a light emission plane 24a of the lighting device 24. As illustrated in FIG. 2, the optical member unit 32 comprises a diffusion sheet 32a for diffusing the illumination light emitted through the light exit plane 30a of the light guide plate 30 to reduce luminance unevenness and illuminance unevenness; a prism sheet 32b having micro prism arrays formed thereon parallel to the lines where the light exit plane 30a and the light entrance planes 30d, 30e meet; and a diffusion sheet 32c for diffusing the illumination light emitted through the prism sheet 32b to reduce luminance unevenness and illuminance unevenness.

There is no specific limitation to the diffusion sheets 32a and 32c and the prism sheet 32b; known diffusion sheets and a known prism sheet may be used. For example, use may be made of the diffusion sheets and the prism sheets disclosed in paragraphs [0028] through [0033] of JP 2005-234397 A by the Applicant of the present application.

Although the optical member unit according to this embodiment comprises the two diffusion sheets 32a and 32c and the prism sheet 32b between the two diffusion sheets, there is no specific limitation to the order in which the prism sheet and the diffusion sheets are arranged or the number thereof to be provided. Nor are the materials of the prism sheet and the diffusion sheets limited specifically, and use may be made of various optical members, provided that they are capable of reducing the luminance unevenness and illuminance unevenness of the illumination light emitted through the light exit plane 30a of the light guide plate 30.

For example, the optical members may also be formed of transmittance adjusting members each comprising a number of transmittance adjusters consisting of diffusion reflectors distributed according to the luminance unevenness and the illuminance unevenness in addition to or in place of the diffusion sheets and the prism sheet described above. Further, the optical member unit may be adapted to have two layers formed using one sheet each of the prism sheet and the diffusion sheet or two diffusion sheets only.

Now, the reflection plate 34 forming part of the lighting device 24 will be described.

The reflection plate 34 is provided to reflect light leaking through the rear plane (the first inclined plane 30b, the second inclined plane 30c, and the curved portion 30h) of the light guide plate 30 back into the light guide plate 30 and helps enhance the light use efficiency. The reflection plate 34 is formed in a shape corresponding to the rear plane (the first inclined plane 30b, the second inclined plane 30c, and the curved portion 30h) of the light guide plate 30 so as to cover the rear plane (the first inclined plane 30b, the second inclined plane 30c, and the curved portion 30h). In this embodiment, the reflection plate 34 is formed into a shape contouring a substantially V-shaped cross section of the light guide plate 30 defined by the rear plane (the first inclined plane 30b, the second inclined plane 30c, and the curved portion 30h) as illustrated in FIGS. 2 and 3B.

The reflection plate 34 may be formed of any material as desired, provided that it is capable of reflecting light leaking through the rear plane (the first inclined plane 30b, the second inclined plane 30c, and the curved portion 30h) of the light guide plate 30. The reflection plate 34 may be formed, for example, of a resin sheet produced by kneading, for example, PET or PP (polypropylene) with a filler and then drawing the resultant mixture to form voids therein for increased reflectance; a sheet with a specular surface formed by, for example, depositing aluminum vapor on the surface of a transparent or white resin sheet; a metal foil such as an aluminum foil or a resin sheet carrying a metal foil; or a thin sheet metal having a sufficient reflective property on the surface.

Upper light guide reflection plates 36 are disposed between the light guide plate 30 and the diffusion sheet 32a, i.e., on the side of the light guide plate 30 closer to the light exit plane 30a, covering the light sources 28 and the end portions of the light exit plane 30a of the light exit plane 30, i.e., the end portion thereof closer to the first light entrance plane 30d and the end portion thereof closer to the second light entrance plane 30e. Thus, the upper light guide reflection plates 36 are disposed to cover an area extending from a part of the light exit plane 30a of the light guide plate 30 to a part of the light source support 52 of the light sources 28 in a direction parallel to the direction of the optical axis. Briefly, two upper light guide reflection plates 36 are disposed respectively at both end portions of the light guide plate 30.

The upper light guide reflection plates 36 thus provided prevent light emitted by the light sources 28 from failing to enter the light guide plate 30 and leaking toward the light exit plane 30a.

Thus, light emitted from the light sources 28 is efficiently admitted through the first light entrance plane 30d and the second light entrance plane 30e of the light guide plate 30, increasing the light use efficiency.

The lower light guide reflection plates 38 are disposed on the side of the light guide plate 30 closer to the rear plane (the first inclined plane 30b, the second inclined plane 30c, and the curved portion 30h) so as to cover a part of the light sources 28. The ends of the lower light guide reflection plates 38 closer to the center of the light guide plate 30 are connected to the reflection plate 34.

The upper light guide reflection plates 36 and the lower light guide reflection plates 38 may be formed of any of the above-mentioned materials used to form the reflection plate 34.

The lower light guide reflection plates 38 prevent light emitted by the light sources 28 from leaking toward the rear plane (the first inclined plane 30b, the second inclined plane 30c, and the curved portion 30h) of the light guide plate 30.

Thus, light emitted from the light sources 28 is efficiently admitted through the first light entrance plane 30d and the second light entrance plane 30e of the light guide plate 30, increasing the light use efficiency.

Although the reflection plate 34 is connected to the lower light guide reflection plates 38 according to this embodiment, their configuration is not so limited; they may be formed of separate materials.

The shapes and the widths of the upper light guide reflection plates 36 and the lower light guide reflection plates 38 are not limited specifically, provided that light emitted by the light sources 28 is reflected and directed toward the first light entrance plane 30d or the second light entrance plane 30e so that light emitted by the light sources 28 can be admitted through the first light entrance plane 30d or the second light entrance plane 30e and then guided toward the center of the light guide plate 30.

Although, according to this embodiment, the upper light guide reflection plates 36 are disposed between the light guide plate 30 and the diffusion sheet 32a, the location of the upper light guide reflection plates 36 is not so limited; it may be disposed between the sheets constituting the optical member unit 32 or between the optical member unit 32 and the upper housing 44.

Next, the housing 26 will be described.

As illustrated in FIG. 2, the housing 26 accommodates the lighting device 24 and holds it from both the light exit plane 24a and the rear plane of the light exit plane 30 (the first inclined plane 30b, the second inclined plane 30c, and the curved portion 30h). The housing 26 comprises the lower housing 42, the upper housing 44, the turnup members 46, and the support members 48.

The lower housing 42 is open at the top and has a configuration comprising a bottom section and lateral sections provided upright on the four sides of the bottom section. In brief, it has substantially the shape of a rectangular box open on one side. As illustrated in FIG. 2, the bottom side and the lateral sides of the housing 42 support the lighting device 24 placed therein from above on the underside and on the lateral sides and covers the faces of the lighting device 24 except the light exit plane 24a, i.e., the plane opposite from the light exit plane 24a of the lighting device 24 (rear plane) and the lateral sides.

The upper housing 44 has the shape of a rectangular box; it has a rectangular opening at the top smaller than the rectangular light emission plane 24a of the lighting device 24 and is open on the bottom side.

As illustrated in FIG. 2, the upper housing 44 is placed from above the lighting device 24 and the lower housing 42, that is, from the light exit plane side, to cover the lighting device 24 and the lower housing 42, which holds the former, as well as four lateral sections 22b.

The turnup members 46 have a substantially U-shaped sectional profile that is identical throughout their length. That is, each turnup member 46 is a bar-shaped member having a U-shaped profile in cross section normal to the direction in which it extends.

As illustrated in FIG. 2, the turnup members 46 are fitted between the lateral sections of the lower housing 42 and the lateral sections of the upper housing 44 such that the outer face of one of the parallel sections of said U shape connects with lateral sections 22b of the lower housing 42 whereas the outer face of the other parallel section connects with the lateral sections of the upper housing 44.

To connect the lower housing 42 with the turnup members 46 and the turnup members 46 with the upper housing 44, any known method may be used such as a method using bolts and nuts and a method using bonds.

Thus providing the turnup members 46 between the lower housing 42 and the upper housing 44 increases the rigidity of the housing 26 and prevents the light guide plate 30 from warping. As a result, for example, light can be efficiently emitted without, or with a minimized level of, luminance unevenness or illuminance unevenness. Further, even where the light guide plate used is liable to develop a warp, the warp can be corrected with an increased certainty or the warping of the light guide plate can be prevented with an increased certainty, thereby allowing light to be emitted through the light exit plane without or with a reduced level of luminance and illuminance unevenness.

The upper housing 44, the lower housing 42, and the turnup members 46 of the housing may be formed of various materials such as metals and resins. The material used is preferably light in weight and very strong.

While the turnup members 46 are discretely provided in the embodiment under discussion, they may be integrated with the upper housing 44 or the lower housing 42. Alternatively, the configuration may be formed without the turnup members.

The support members 48 are rod members having an identical cross section normal to the direction in which they extend throughout their length.

As illustrated in FIG. 2, the support members 48 are provided between the reflection plate 34 and the lower housing 42, more specifically, between the reflection plate 34 and the lower housing 42 close to the end of the first inclined plane 30b of the light guide plate 30 on which the first light entrance plane 30d is located and close to the end of the second inclined plane 30c of the light guide plate 30 on which the second light entrance plane 30e is located. The support members 48 thus secure the light guide plate 30 and the reflection plate 34 to the lower housing 42 and thus support them.

With the support members 48 supporting the reflection plate 34, the light guide plate 30 and the reflection plate 34 can be brought into a close contact. Furthermore, the light guide plate 30 and the reflection plate 34 can be secured to a given position of the lower housing 42.

While the support members 48 are discretely provided according to this embodiment, the invention is not limited thereto; they may be integrated with the lower housing 42 or the reflection plate 34. To be more specific, the lower housing 42 may be adapted to have projections to serve as support members or the reflection plate 34 may be adapted to have projections to serve as support members 48.

The locations of the support members are also not limited specifically and they may be located anywhere between the reflection plate 34 and the lower housing 42. To stably hold the light guide plate, the support members 48 are preferably located closer to the ends of the light guide plate 30 or, according to this embodiment, near the first light entrance plane 30d and the second light entrance plane 30e.

The support members 48 may be given various shapes and formed of various materials without specific limitations. For example, two or more of the support members may be provided at given intervals.

Further, the support members 48 may have such a shape as to fill the space formed by the reflection plate and the lower housing. Specifically, the support members may have a shape such that the side thereof facing the reflection plate has a contour following the surface of the reflection plate and the side thereof facing the lower housing has a contour following the surface of the lower housing. Where the support members are adapted to support the whole surface of the reflection plates, separation of the light guide plate and the reflection plate can be positively prevented and, further, generation of luminance unevenness and illuminance unevenness that might otherwise be caused by light reflected by the reflection plates can be prevented.

The backlight unit 20 is configured basically as described above.

In the backlight unit 20, light emitted by the light sources 28 provided on both sides of the light guide plate 30 strikes the light entrance planes, i.e., the first light entrance plane 30d and the second light entrance plane 30e, of the light guide plate 30. Then, the light admitted through the respective planes is scattered by scatterers contained inside the light guide plate 30 as will be described later in detail as the light travels through the inside of the light guide plate 30 and, directly or after being reflected by the rear plane (the first inclined plane 30b, the second inclined plane 30c, and the curved portion 30h), exits through the light exit plane 30a. In the process, a part of the light leaking through the rear plane is reflected by the reflection plate 34 to enter the light guide plate 30 again.

Thus, light emitted through the light exit plane 30a of the light guide plate 30 is transmitted through the optical member 32 and emitted through the light emission plane 24a of the lighting device 24 to illuminate the liquid crystal display panel 12.

The liquid crystal display panel 12 uses the drive unit 14 to control the transmittance for the light according to the position so as to display characters, figures, images, etc. on its surface.

Now, the planar lighting device (backlight unit) 20 will be described in greater detail by referring to specific examples.
1) 46-Inch Screen Size A light guide plate 30 having dimensions for a 46-inch screen was used for measurements. Specifically, this example of the light guide plate had a following configuration: the length from the first light entrance plane 30d to the second light entrance plane 30e measured 575 mm; the length from the light exit plane 30a to the rear plane at the bisector α, i.e., a maximum thickness D of the light guide plate, measured 3.82 mm; the thickness of the light guide plate at the first light entrance plane 30d and the second light entrance plane 30e, i.e., a minimum thickness of the light guide plate, measured 2.0 mm; the thickness of the first layer 60 was 1.5 mm; the thickness of the second layer 62 was 1.75 mm; the thickness of the third layer 64 was 0.57 mm; and the radius of curvature R of the curved portion 30h of the rear plane was 17,500 mm. The scattering particles kneaded and dispersed into the light guide plate had a diameter of 7 μm.

Using the light guide plate having the above configuration, measured were relative illuminance distributions and light use efficiencies of a working example 11 where the first layer 60 had a particle density $Np_1$ of 0.046 wt %, the second layer 62 had a particle density $Np_2$ of 0.054 wt %, and the third layer 64 had a particle density $Np_3$ of 0.113 wt %; a working example 12 where the first layer 60 had a particle density $Np_1$ of 0.046 wt %, the second layer 62 had a particle density $Np_2$ of 0.071 wt %, and the third layer 64 had a particle density $Np_3$ of 0.096 wt %; and a working example 13 where the first layer 60 had a particle density $Np_1$ of 0.054 wt %, the second layer 62 had a particle density $Np_2$ of 0.071 wt %, and the third layer 64 had a particle density $Np_3$ of 0.088 wt %. Measurements were made using a computer simulation.

To provide a comparative example 11, measurements were likewise made using a light guide plate having a single particle density of 0.046 wt % in the first layer 60, the second layer 62, and the third layer 64, so that the light guide plate contains scattering particles dispersed therein at a consistent density throughout.

Because an area where illuminance increases steeply close to where light is admitted is covered with a reflection member in actual use and, hence, light emitted through such an area is not allowed to exit through the corresponding area of the planar lighting device, light striking such an area of the light guide plate is not recognized as light producing uneven illuminance and not recognized as light emitted through the light exit plane. Accordingly, light emitted through such an area of the light guide plate was disregarded.

As described earlier, the luminance distribution and the illuminance distribution of the light guide plate according to the first embodiment basically share similar tendencies and so do luminance unevenness and illuminance unevenness. Thus, illuminance unevenness is also observed where luminance unevenness appears such that they share similar tendencies. This will also apply to the examples given below. The light use efficiency herein denotes the ratio of the sum of intensity of light emitted through the entire light exit plane of a light guide plate of interest to that of the comparative example 11 of the light guide plate or the single-layer light guide plate, with the latter taken to be 100%.

Figure 6:
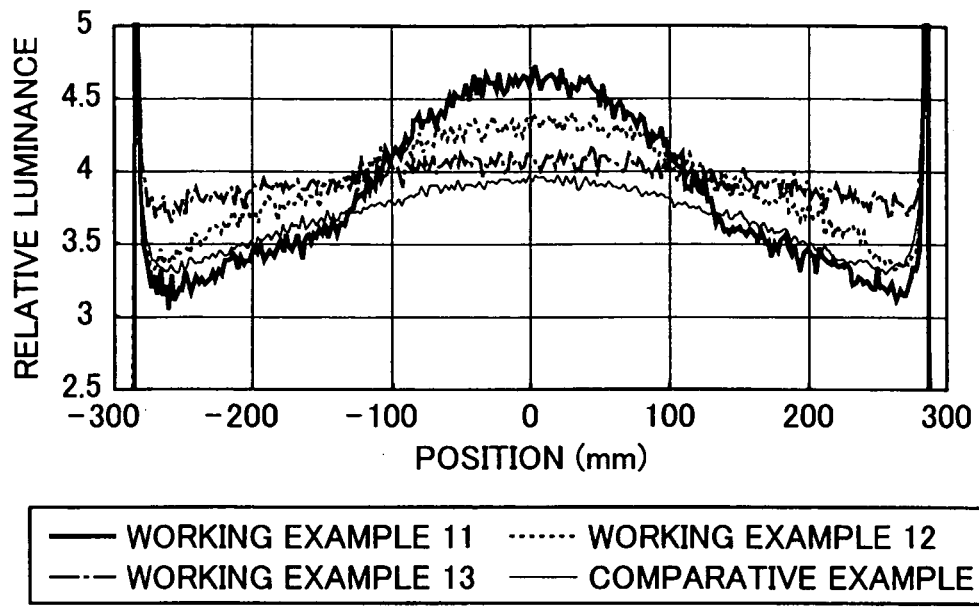
FIG. 6 is a graph illustrating measurements of relative illuminance distributions of light emitted through the light exit plane of the light guide plate according to working example 11 to 13.

Table 1 gives measurements of light use efficiency; FIG. 6 illustrates relative illuminance distributions. In FIG. 6, the vertical axis indicates the relative illuminance, and the horizontal axis indicates the distance [mm] (position measured) from the center of the light guide plate. In the graph, the working example 11 is indicated in a bold solid line, the working example 12 in a broken line, the working example 13 in a chain line, and the comparative example 11 in a thin solid line.

TABLE 1

| 46-inch | | Working ex. 11 | Working ex. 12 | Working ex. 13 | Comparative ex. 11 |
|---|---|---|---|---|---|
| Max. thickness (mm) | | 3.82 | 3.82 | 3.82 | 3.82 |
| Particle density (wt %) | 1st layer | 0.046 | 0.046 | 0.054 | 0.046 |
| | 2nd layer | 0.054 | 0.071 | 0.071 | 0.054 |
| | 3rd layer | 0.113 | 0.096 | 0.088 | |
| Light use efficiency (%) | | 104 | 106 | 106 | 100 |

Now, the comparative example 11 will be described referring to FIG. 7.

Light guide plates were fabricated such that they each had dimensions for a 46-inch screen and were not divided into layers, that is, had a consistent particle density throughout the whole structure but the particle density of one light guide plate was different from that of another. Then, light use efficiency of each light guide plate was calculated in the same manner as above. FIG. 7 is a graph illustrating relationships between particle density on the one hand and light use efficiency and in-plane luminance uniformity on the other hand of the light guide plate. In FIG. 7, the vertical axis indicates the light use efficiency [%] and the in-plane luminance uniformity [%], and the horizontal axis indicates the particle density [wt %].

An in-plane luminance uniformity A [%] may be expressed using Lc/Le as $$A=(Lc/Le)\times 100,$$

where Lc is a luminance in an area closer to the center of the light exit plane, and Le a luminance in an area closer to a peripheral area.

A convexness ratio B [%] may be expressed as $$B=100-A$$

Figure 7:
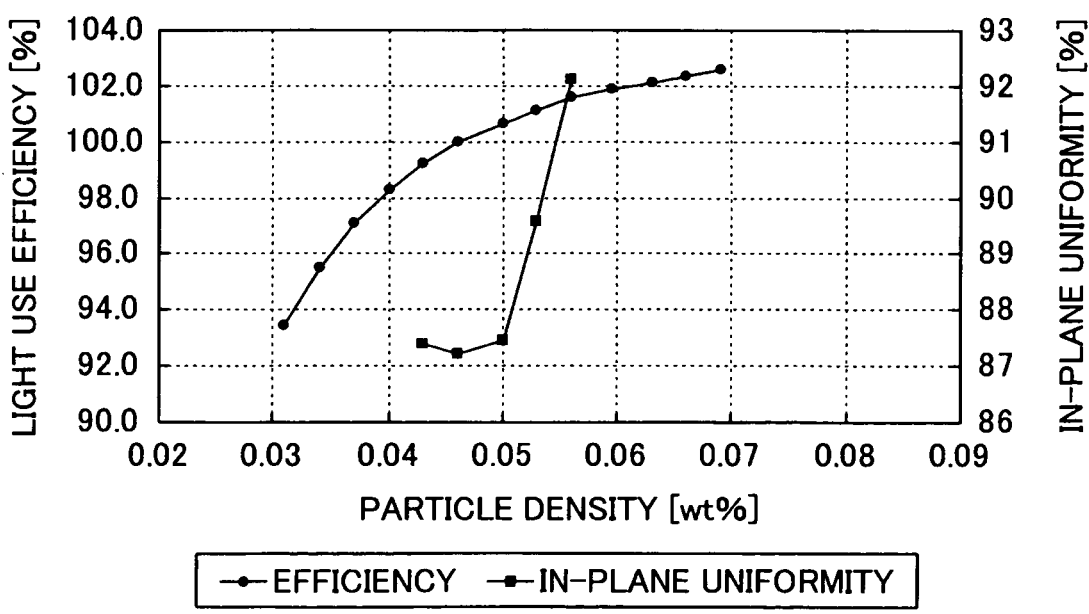
FIG. 7 is a graph illustrating relationships between particle density of the light guide plate on the one hand and light use efficiency [wt %] and in-plane uniformity [%] observed in the light emitted through the light exit plane on the other hand according to the working examples 11 to 13.

It appears from FIG. 7 that when the 46-inch light guide plate contains scattering particles dispersed at a consistent density throughout therein, the in-plane luminance uniformity can be at its lowest or, in other words, the convexness ratio is at its highest, and the light use efficiency can be kept at the highest level when the particle density is 0.046 wt %. Thus, a light guide plate having a consistent particle density of 0.046 wt % was used as a comparative example 11 of the light guide plate.

Note that although FIG. 7 does not show the in-plane luminance uniformity for a range under a particle density of 0.040 wt %, the convexness ratio decreases because the in-plane luminance uniformity is higher in that range than when the particle density is 0.046 wt %, and hence the light use efficiency also decreases.

Also in the examples described below having different dimensions, a particle density that yields a high light use efficiency and the highest convexness ratio was obtained with the scattering particles dispersed at a consistent density throughout the light guide plate, and a light guide plate having the particle density thus obtained was used as a comparative example.

Table 1 and FIG. 6 show that the light guide plates such as the working examples 11, 12, and 13 having different particle densities among three layers can emit light with an equal or greater light use efficiency than a single-layer light guide plate having a consistent particle density throughout like the comparative example 11 and achieve a convex curve illuminance distribution.

Further, it will be understood that as in the working examples 11, 12, and 13, the light guide plate, even when given an identical shape, can emit light with an illuminance distribution that may be varied by varying the particle density among the layers and, moreover, emit light having an illuminance distribution with a desired convexness ratio even when the light guide plate has enlarged dimensions.

2) 32-Inch Screen Size

A light guide plate 30 having dimensions for a 32-inch screen was used for measurements. Specifically, this example had a following configuration: the length from the first light entrance plane 30d to the second light entrance plane 30e measured 418 mm; a maximum thickness D of the light guide plate measured 3.1 mm; a minimum thickness of the light guide plate measured 2.0 mm; the thickness of the first layer 60 was 1.5 mm; the thickness of the second layer 62 was 1.03 mm; the thickness of the third layer 64 was 0.57 mm; and the radius of curvature R of the curved portion 30h of the rear plane was 17,500 mm. The scattering particles kneaded and dispersed into the light guide plate had a diameter of 7 µm.

Using the light guide plate having the above configuration, measured were relative illuminance distributions and light use efficiencies of a working example 21 where the first layer 60 had a particle density $Np_1$ of 0.046 wt %, the second layer 62 had a particle density $Np_2$ of 0.063 wt %, and the third layer 64 had a particle density $Np_3$ of 0.166 wt %; a working example 22 where the first layer 60 had a particle density $Np_1$ of 0.029 wt %, the second layer 62 had a particle density $Np_2$ of 0.063 wt %, and the third layer 64 had a particle density $Np_3$ of 0.166 wt %; and a working example 23 where the first layer 60 had a particle density $Np_1$ of 0.063 wt %, the second layer 62 had a particle density $Np_2$ of 0.079 wt %, and the third layer 64 had a particle density $Np_3$ of 0.179 wt %. Measurements were made using a computer simulation. To provide a comparative example 21, measurements were likewise made using a light guide plate having a single particle density of 0.054 wt % in the first layer 60, the second layer 62, and the third layer 64, so that the light guide plate contains scattering particles dispersed therein at a consistent density throughout.

The light use efficiency herein denotes the ratio of the sum of intensity of light emitted through the entire light exit plane of a light guide plate of interest to that of the comparative example 21 of the light guide plate, with the latter taken to be 100%.

Figure 8:
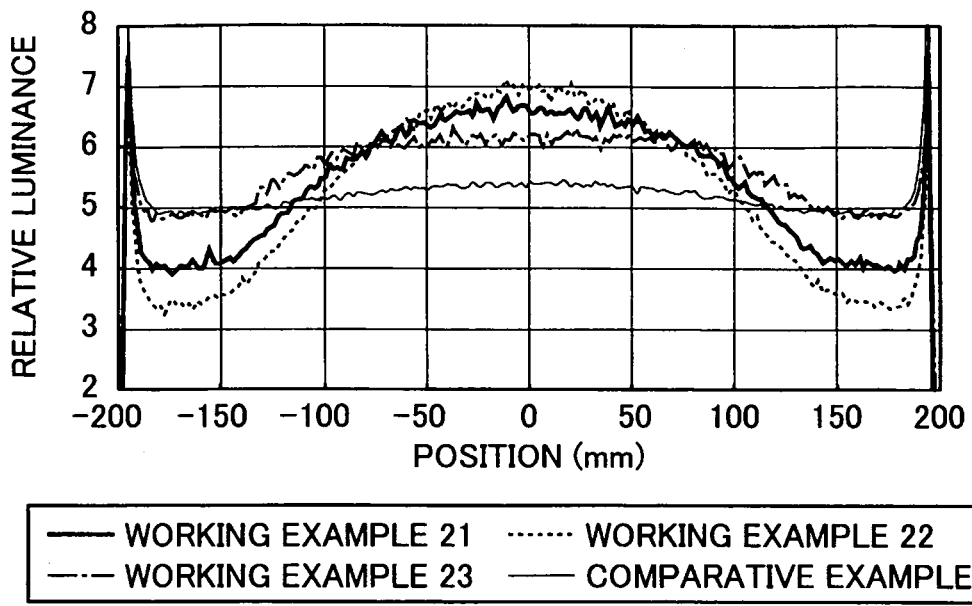
FIG. 8 is a graph illustrating measurements of relative illuminance distributions of light emitted through the light exit plane of the light guide plate according to working examples 21 to 23.

Table 2 gives measurements of light use efficiency; FIG. 8 illustrates relative illuminance distributions. In FIG. 8, the vertical axis indicates the relative illuminance, and the horizontal axis indicates the distance [mm] (position measured) from the center of the light guide plate. In the graph, the working example 21 is indicated in a bold solid line, the working example 22 in a broken line, the working example 23 in a chain line, and the comparative example 21 in a thin solid line.

TABLE 2

| 32-inch | | Working ex. 21 | Working ex. 22 | Working ex. 23 | Comparative ex. 21 |
|---|---|---|---|---|---|
| Max. thickness (mm) | | 3.1 | 3.1 | 3.1 | 3.1 |
| Particle density (wt %) | 1st layer | 0.046 | 0.029 | 0.063 | 0.054 |
| | 2nd layer | 0.063 | 0.063 | 0.079 | |
| | 3rd layer | 0.166 | 0.166 | 0.179 | |
| Light use efficiency (%) | | 103 | 100 | 107 | 100 |

Table 2 and FIG. 8 show that the light guide plates such as the working examples 21, 22, and 23 having different particle densities among three layers can emit light with an equal or greater light use efficiency than a single-layer light guide plate having a consistent particle density throughout like the comparative example 21 and achieve a convex curve illuminance distribution.

Further, it will be understood that as in the working examples 21, 22, and 23, the light guide plate, even when given an identical shape, can emit light with an illuminance distribution that may be varied by varying the particle density among the layers and, moreover, emit light having an illuminance distribution with a desired convexness ratio even when the light guide plate has enlarged dimensions.

3) 65-Inch Screen Size

A light guide plate 30 having dimensions for a 65-inch screen was used for measurements. Specifically, this example had a following configuration: the length from the first light entrance plane 30d to the second light entrance plane 30e measured 830 mm; a maximum thickness D of the light guide plate measured 4.78 mm; a minimum thickness of the light guide plate measured 2.0 mm; the thickness of the first layer 60 was 1.5 mm; the thickness of the second layer 62 was 2.71 mm; the thickness of the third layer 64 was 0.57 mm; and the radius of curvature R of the curved portion 30h of the rear plane was 17,500 mm. The scattering particles kneaded and dispersed into the light guide plate had a diameter of 7 μm.

Using the light guide plate having the above configuration, measured were relative illuminance distributions and light use efficiencies of a working example 31 where the first layer 60 had a particle density $Np_1$ of 0.042 wt %, the second layer 62 had a particle density $Np_2$ of 0.054 wt %, and the third layer 64 had a particle density $Np_3$ of 0.071 wt %; and a working example 32 where the first layer 60 had a particle density $Np_1$ of 0.029 wt %, the second layer 62 had a particle density $Np_2$ of 0.046 wt %, and the third layer 64 had a particle density $Np_3$ of 0.079 wt %. Measurements were made using a computer simulation. To provide a comparative example 31, measurements were likewise made using a light guide plate having a single particle density of 0.042 wt % in the first layer 60, the second layer 62, and the third layer 64, so that the light guide plate contains scattering particles dispersed therein at a consistent density throughout.

The light use efficiency herein denotes the ratio of the sum of intensity of light emitted through the entire light exit plane of a light guide plate of interest to that of the comparative example 31 of the light guide plate, with the latter taken to be 100%.

Figure 9:
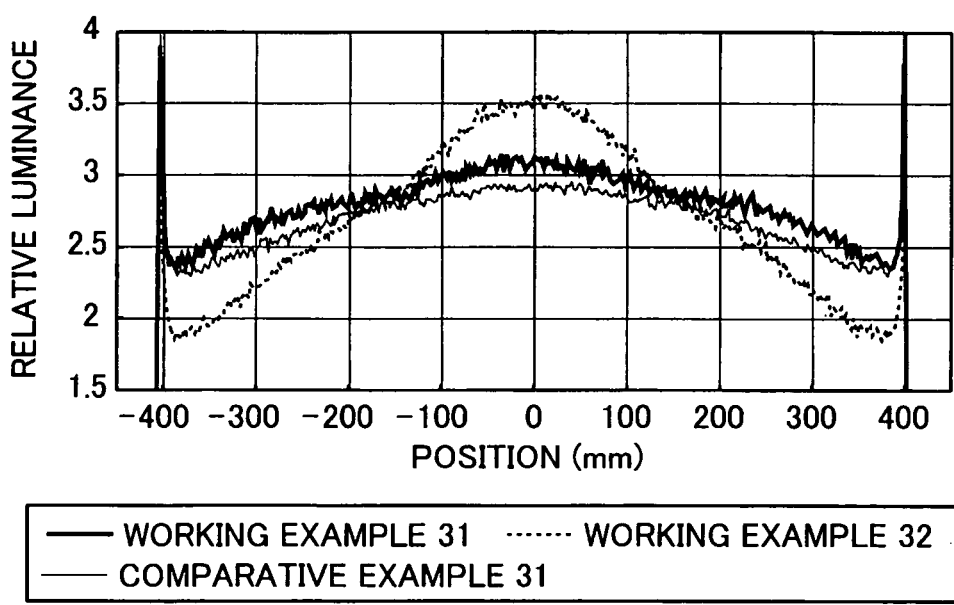
FIG. 9 is a graph illustrating measurements of relative illuminance distributions of light emitted through the light exit plane of the light guide plate according to working example 31 and 32.

Table 3 gives measurements of light use efficiency; FIG. 9 illustrates relative illuminance distributions. In FIG. 9, the vertical axis indicates the relative illuminance, and the horizontal axis indicates the distance [mm] (position measured) from the center of the light guide plate. In the graph, the working example 31 is indicated in a bold solid line, the working example 32 in a broken line, and the comparative example 31 in a thin solid line.

TABLE 3

| 65-inch | | Working ex. 31 | Working ex. 32 | Comparative ex. 31 |
|---|---|---|---|---|
| Max. thickness (mm) | | 4.78 | 4.78 | 4.78 |
| Particle density (wt %) | 1st layer | 0.042 | 0.029 | 0.042 |
| | 2nd layer | 0.054 | 0.046 | |
| | 3rd layer | 0.071 | 0.079 | |
| Light use efficiency (%) | | 104 | 101 | 100 |

Table 3 and FIG. 9 show that the light guide plates such as the working examples 31 and 32 having different particle densities among three layers can emit light with an equal or greater light use efficiency than a single-layer light guide plate having a consistent particle density throughout like the comparative example 31 and achieve a convex curve illuminance distribution.

Further, it will be understood that as in the working examples 31 and 32, the light guide plate, even when given an identical shape, can emit light with an illuminance distribution that may be varied by varying the particle density among the layers and, moreover, emit light having an illuminance distribution with a desired convexness ratio even when the light guide plate has enlarged dimensions.

4) Film Light Guide Plate

A film light guide plate 30 having a thickness of 1 mm or less was used for measurements. The light guide plate had dimensions for a 46-inch screen size. Specifically, this example had a following configuration: the length from the first light entrance plane 30d to the second light entrance plane 30e measured 575 mm; a maximum thickness D of the light guide plate measured 0.56 mm; a minimum thickness of the light guide plate measured 0.4 mm; the thickness of the first layer 60 was 0.3 mm; the thickness of the second layer 62 was 0.227 mm; the thickness of the third layer 64 was 0.033 mm; and the radius of curvature R of the curved portion 30h of the rear plane was 160,000 mm. The scattering particles kneaded and dispersed into the light guide plate had a diameter of 7 μm.

First, using the light guide plate having the above configuration, measured were relative illuminance distributions and light use efficiencies of an working example 41 where the first layer 60 had a particle density $Np_1$ of 0 wt %, the second layer 62 had a particle density $Np_2$ of 0.079 wt %, and the third layer 64 had a particle density $Np_3$ of 0.179 wt %; and a working example 42 where the first layer 60 had a particle density $Np_1$ of 0.029 wt %, the second layer 62 had a particle density $Np_2$ of 0.079 wt %, and the third layer 64 had a particle density $Np_3$ of 0.179 wt %. Measurements were made using a computer simulation. Further, measurements were likewise made of a comparative example 41 of the light guide plate having a particle density of 0.046 wt % in all of the first layer 60, the second layer 62, and the third layer 64, i.e., a light guide plate having a consistent particle density throughout, and also of a reference example 41 of the light guide plate having a maximum thickness D of 4.0 mm, a minimum thickness of 2.0 mm and a consistent particle density of 0.046 wt % throughout, i.e., a light guide plate having a different thickness than the comparative example 41.

The light use efficiency herein denotes the ratio of the sum of intensity of light emitted through the entire light exit plane of a light guide plate of interest to that of the reference example 41, with the latter taken to be 100%.

Table 4 gives measurements of light use efficiency; FIG. 9 illustrates relative illuminance distributions. In FIG. 9, the vertical axis indicates the relative illuminance, and the horizontal axis indicates the distance [mm] (position measured) from the center of the light guide plate. In the graph, the working example 41 is indicated in a chain double-dashed line, the working example 42 in a solid line, the comparative example 41 in a chain line, and the reference example 41 in a broken line.

TABLE 4

| 46-inch | | Working ex. 41 | Working ex. 42 | Comparative ex. 41 | Reference ex. 41 |
|---|---|---|---|---|---|
| Max. thickness (mm) | | 0.56 | 0.56 | 0.56 | 4.0 |
| Particle density (wt %) | 1st layer | 0 | 0.029 | 0.046 | 0.046 |
| | 2nd layer | 0.079 | 0.079 | | |
| | 3rd layer | 0.179 | 0.179 | | |
| Light use efficiency (%) | | 89 | 96 | 90 | 100 |

Figure 10:
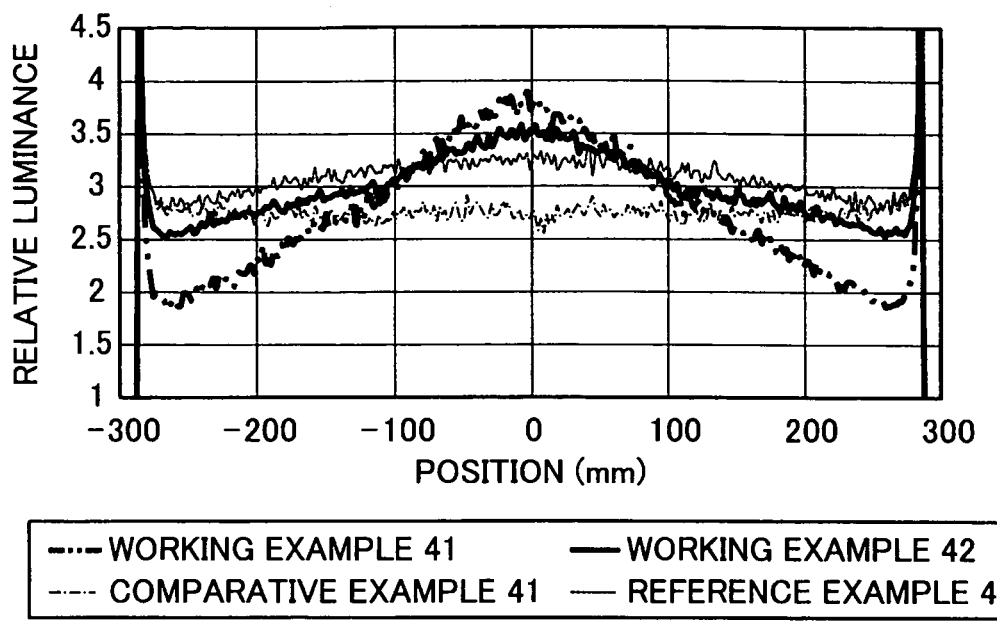
FIG. 10 is a graph illustrating measurements of relative illuminance distributions of light emitted through the light exit plane of the inventive light guide plate according to working example 41 and 42.

It will be understood that Table 4 and FIG. 10 show that the light guide plates like the working examples 41 and 42 having different particle densities among three layers can emit light with an equal or greater light use efficiency than a single-layer light guide plate like the comparative example 41 having the same thickness and a consistent particle density throughout, thus achieving a convex illuminance distribution. Further, the light guide plate described above achieves an illuminance distribution representing a more accentuated convex curve with substantially the same light use efficiency than is possible with the thicker, single-layer light guide plate like the reference example 41 as well as a design with a reduced thickness.

Further, it will be understood that as in the working examples 41 and 42, the light guide plate, even when given an identical shape, can emit light with an illuminance distribution that may be varied by varying the particle density among the layers and, moreover, emit light having an illuminance distribution with a desired convexness ratio even when the light guide plate has enlarged dimensions.

The above results illustrate that every working example of the light guide plate having different particle densities among three layers achieves equal or greater light use efficiency than is possible with the comparative example representing a single-layer light guide plate having a more accentuated convex curve illuminance distribution.

Further, it will be understood that the light guide plate, even when given an identical shape, can emit light with an illuminance distribution that may be varied by varying the particle density among the layers and, moreover, emit light having an illuminance distribution with a desired convexness ratio even when the light guide plate has enlarged dimensions.

The advantageous effects produced by the present invention are obvious from the above description.

Although component parts of the light guide plate and the planar lighting device (backlight unit) have been described above in detail, the invention is not limited to those described above.

Variation of First Embodiment

For example, although, according to the first embodiment, the interface z between the first layer closer to the light exit plane and the second layer in contact with the first layer is provided so that the ends of the interface z are located in planes contained in the first light entrance plane 30$d$ and the second light entrance plane 30$e$, whereas the interface y between the second layer and the third layer closer to the curved portion 30$h$ is provided in a plane that connects the ends of the first inclined plane 30$b$ and the second inclined plane 30$c$ closer to the curved portion 30$h$, the invention is not limited to such a configuration. The locations of the interface z and the interface y in the direction normal to the light exit plane are not specifically limited provided that the light guide plate comprises the first layer, the second layer, and the third layer in this order, the first layer being closest to the light exit plane.

Figure 11A:
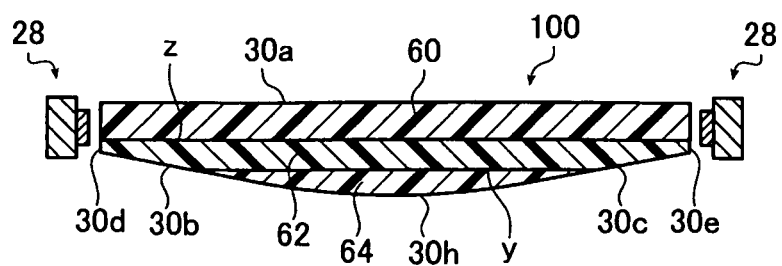
FIGS. 11A and 11B are cross sectional views schematically illustrating a planar lighting device using a variation of the first embodiment of the light guide plate of the invention.
Figure 11B:
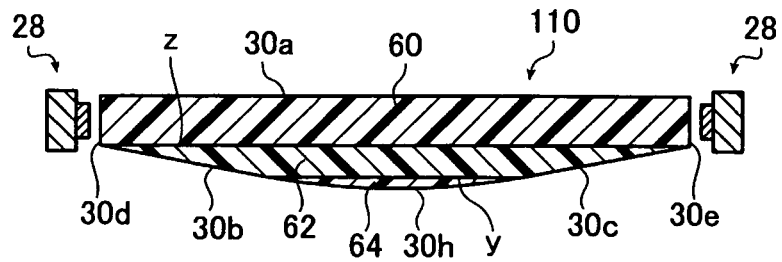

FIGS. 11A and 11B are cross sectional views schematically illustrating a backlight using a light guide plate according to a variation of the first embodiment of the invention.

A light guide plate 100 illustrated in FIG. 11A has the interface y formed in a position such that its two opposite sides are contained in the first inclined plane 30$b$ and the second inclined plane 30$c$, respectively. In other words, the light guide plate 100 is essentially composed of the first layer 60 each forming a part of the light entrance planes (the first light entrance plane 30$d$ and the second light entrance plane 30$e$), the second layer 62 each forming a part of the light entrance planes 30$d$, 30$e$ and a part of the inclined planes (the first inclined plane 30$b$ and the second inclined plane 30$c$), and the third layer 64 forming a part of the inclined planes 30$b$, 30$c$ and the curved portion 30$h$, the first, the second, and the third layers sharing the interfaces y and z between them. The second layer has a higher particle density than the first layer, and the third layer has a higher particle density than the second layer.

A light guide plate 110 illustrated in FIG. 11B has the interface z formed between the light entrance planes 30$d$, 30$e$ and the inclined plane 30$b$, 30$c$. In other words, the light guide plate 110 is essentially composed of the first layer 60 forming the light entrance planes 30$d$, 30$e$, the second layer 62 forming the inclined planes 30$b$, 30$c$, and the third layer 64 forming the curved portion 30$h$. The second layer has a higher particle density than the first layer, and the third layer has a higher particle density than the second layer.

The positions of the interface z and interface y normal to the light exit plane are not limited to the above embodiments, provided that the light guide plate comprises three layers, the first layer, the second layer, and the third layer in this order from the light exit plane. For example, the interface z may be located so that its ends are contained in the inclined planes, and the interface y may be located so that its ends are contained in the curved portion.

Thus, when the second layer has a higher particle density than the first layer, and the third layer has a higher particle density than the second layer, the combined particle density gradually increases with the increasing distance from the light entrance planes and, therefore, light reflected by the effects of the scattering particles toward the light exit plane increases with the increasing distance from the light entrance planes, with the result that an illuminance distribution having a desirable convexness ratio can be obtained and the light use efficiency can be improved as in the case where the interface z is provided at the light entrance planes and the interface y is provided at the boundary between the inclined planes and the curved portion, regardless of the locations of the interface z and the interface y normal to the light exit plane.

The interface y is preferably located in a position such that its ends meet the rear plane (inclined planes and the curved portion), i.e., a plane that is inclined with respect to the light exit plane of the light guide plate. When the interface y, the boundary between the second and the third layers, is located in a position such that its ends meet the rear plane, both the second and the third layers increase in thickness with the increasing distance from the entrance planes toward the center of the light guide plate, so that the combined particle density can favorably be increased gradually with the increasing distance from the light entrance planes.

Further, the interface y is preferably located in a position such that its ends meet the ends of the curved portions (joints of the inclined planes and the curved portion). Thus, the region defined by the curved portion preferably represents the third layer. Where the configuration comprises the third layer having a high particle density, it is possible that the luminance distribution exhibited by the light leaving the light exit plane may abruptly change in the direction normal to the light entrance plane at the boundary between the regions defined by the second and the third layers. A configuration where the interface y is located in a position such that its ends meet the joints of the inclined planes and the curved portion, on the other hand, prevents an abrupt change of the luminance distribution of the exiting light at positions corresponding to the ends of the region comprising the third layer. Further, because the third layer having a high particle density is provided in a position of the curved portion where the angle with respect to the light exit plane is small, decrease in luminance of the exiting light can be curbed even though the inclination may be small.

Although the interface z between the first layer and the second layer and the interface y between the second layer and the third layer are both a flat plane parallel to the light exit plane according to this embodiment, the invention is not limited thereto; the interface may be an inclined plane or a curved plane. For example, the interface z and the interface y may be planes dividing the thickness of the light guide plate into three equal sections or may be planes parallel to the inclined planes.

In this embodiment, the light exit plane 30a of the light guide plate 30 has the longer sides adjacent the light entrance planes 30d, 30e and the shorter sides adjacent the lateral planes (where the light entrance planes are not provided) in order to emit light through the light exit plane 30a with an enhanced luminance and efficiency. The invention, however, is not limited to such a configuration; the light entrance planes may be provided on the shorter sides, with the lateral sides being the longer sides, or the light exit plane may be formed into a square.

Although the light guide plate has a three-layer configuration having different densities of scattering particles in the above embodiments, the invention is not limited thereto; the light guide plate may comprise four or more layers. In such a configuration, the layers have an increasingly low particle density as their position approaches the light exit plane and have an increasingly high particle density as their position approaches the rear plane. A convex luminance distribution can be achieved and the light use efficiency can be increased even with a multi-layer light guide plate where the layers have an increasingly high particle density as their position approaches the rear plane.

Since the combined particle density gradually increases with the increasing distance from the light entrance planes even with a two-layer light guide plate having a higher particle density in the layer closer to the rear plane, light reflected by the effects of the scattering particles toward the light exit plane increases with the increasing distance from the light entrance planes, achieving an illuminance distribution that represents a convex curve with a desirable proportion. However, because it is impossible to achieve a more preferable combined particle density distribution with a two-layer light guide plate than with a light guide plate having three or more layers, it is difficult to achieve a greater improvement on illuminance distribution (convexness ratio) and light use efficiency with a two-layer light guide plate than is possible with a light guide plate having three or more layers. Therefore, fabricating a large and thin two-layer light guide plate involves greater difficulties than is the case with a light guide plate having three or more layers.

With a light guide plate having three or more layers with different particle densities, on the other hand, the combined particle density displays the more preferable combined particle density distribution as the number of layers increase, so that a more preferable illuminance distribution (convexness ratio) and light use efficiency may be achieved but only at the cost of difficulties in fabrication and increased costs.

Therefore, the light guide plate comprises preferably three layers having different particle densities. A three-layer light guide plate permits achieving an illuminance distribution representing a convex curve with a more desirable proportion while further enhancing the light use efficiency. In addition, a three-layer light guide plate is easy to fabricate and thus does not increase fabrication costs.

When a light guide plate consists of n layers (n is an integer greater than 2), it is preferable that the relationships between the particle density $Np_1$ of the scattering particles in the first layer and the particle density $Np_i$ of the scattering particles in the i-th layer (i is two or greater and not greater than n) counted from the light exit plane satisfy 0 wt %<$Np_1$≦0.15 wt % and 0.008 wt %<$Np_i$<0.4 wt %.

With the n layers of the light guide plate satisfying the above relationships (n is an integer greater than 2), the first layer, which has a lower particle density, guides the incoming light deep in the light guide plate toward the center thereof without scattering it greatly, the admitted light being scattered the more by the i-th layer having a higher particle density than the first layer and scattered to a greater extent through the nth layer having the highest particle density as the light comes closer to the center of the light guide plate, thus increasing the amount of light emitted through the light exit plane. In brief, an illuminance distribution representing a convex curve with a desirable proportion can be achieved while further enhancing the light use efficiency.

Further, it is also preferable that the relationships between the particle density $Np_1$ of the scattering particles in the first layer of the light guide plate comprising the n layers (n is an integer not smaller than 3) and the particle density $Np_i$ of the scattering particles in the i-th layer (i is two or greater and not greater than n) counted from the light exit plane satisfy $Np_1$=0 wt % and 0.015 wt %<$Np_i$<0.75 wt %. Thus, the scattering particles are not dispersed in the first layer in order to guide the admitted light deep in the light guide plate 30, with the scattering particles kneaded and dispersed in the second and the following layers counted from the light exit plane so that the light is increasingly scattered as it comes closer to the center of the light guide plate, thereby increasing the amount of light emitted through the light exit plane 30a.

Also when the first layer and the i-th layer satisfy the above relationships, an illuminance distribution representing a convex curve with a desirable proportion can be achieved while further enhancing the light use efficiency.

Now, a two-layer light guide plate and a three-layer light guide plate will be described in greater detail by referring to specific examples.

In these examples, a computer simulation was conducted on a 2-layer light guide plate and a 3-layer light guide plate to obtain light use efficiency and a relative illuminance distribution as in the above working examples.

Here, the above-described working example 41 was used as a three-layer light guide plate, and the above-described working example 51 was used as a two-layer light guide plate to measure the relative illuminance distribution and the light use efficiency.

Figure 12:
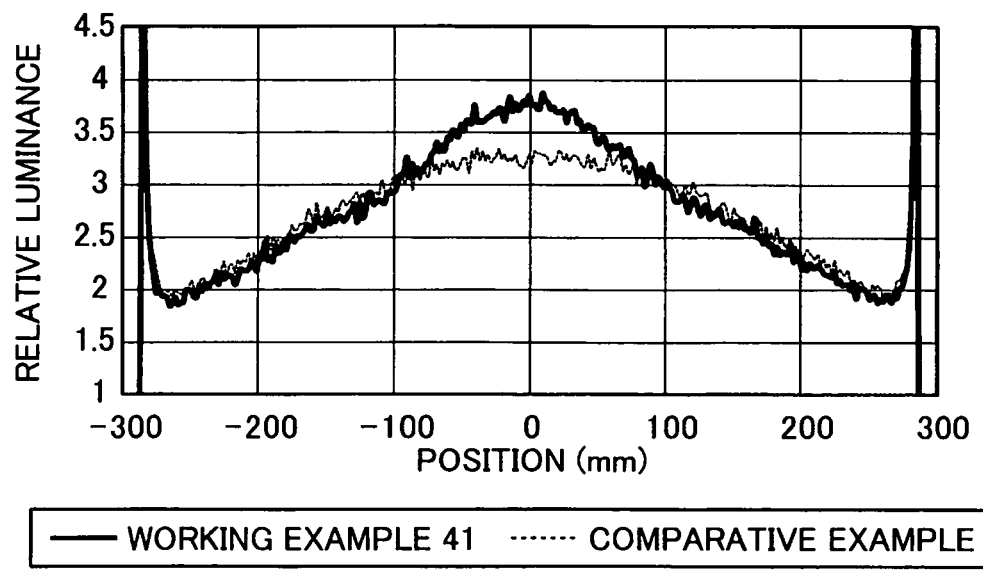
FIG. 12 is a graph illustrating measurements of relative illuminance distributions of light emitted through the light exit plane of the light guide plate.

Table 5 gives measurements of light use efficiency; FIG. 12 illustrates relative illuminance distributions. In FIG. 12, the vertical axis indicates the relative illuminance, and the horizontal axis indicates the distance [mm] (position measured) from the center of the light guide plate. In the graph, the working example 41 is indicated in a solid line, and the comparative example 51 in a broken line.

TABLE 5

| 46-inch | | Working ex. 41 | Comparative ex. 51 |
|---|---|---|---|
| Max. thickness (mm) | | 0.56 | 0.56 |
| Particle density (wt %) | 1st layer | 0 | 0 |
| | 2nd layer | 0.079 | 0.079 |
| | 3rd layer | 0.179 | |
| Light use efficiency (%) | | 89 | 87 |

Table 5 and FIG. 12 show that the three-layer light guide plate, the working example 41, can achieve an equal or greater light use efficiency and a more accentuated convex curve illuminance distribution than the two-layer light guide plate, the comparative example 51, having the same particle densities in the first and the second layers as the three-layer light guide plate has in the first and the second layers. Comparing the illuminance distribution of the three-layer light guide plate, the working example 41, and that of the two-layer light guide plate, the comparative example 51, it will be apparent that both substantially coincide in regions closer to the light entrance planes but the illuminance distribution of the three-layer light guide plate, the working example 41, is higher in a region closer to the center. This indicates that provision of the third layer improves the relative illuminance in the region closer to the center over that achieved with the two-layer light guide plate.

Although the rear plane of the light guide plate is defined by the inclined planes and the curved portion in this embodiment, the shape of the rear plane is not limited specifically: for example, the rear plane may be defined by two inclined planes or by two or more inclined sections. In other words, the rear plane may have inclined sections each having different tilt angles according to their positions. Alternatively, the rear plane may have a curved contour like a part of an ellipse in a cross section normal to a longitudinal direction of one of the two light entrance planes or may be defined by two or more curved planes combined. Still alternatively, the rear plane may be defined by curved planes and inclined planes combined. Further, the rear plane may be curved outwardly or inwardly with respect to the light exit plane, or may have outwardly and inwardly curved sections combined.

The rear plane preferably has a configuration such that its tilt angle with respect to the light exit plane decreases from the light entrance planes toward the center of the light guide plate or toward a position where the light guide plate is thickest. With the tilt angle of the rear plane gradually decreasing, light having less luminance unevenness can be emitted through the light exit plane.

The rear plane more preferably has an aspherical cross section that may be expressed by a 10-th order polynomial. Where the rear plane has such a configuration, light having less luminance unevenness can be emitted regardless of the thickness of the light guide plate.

The rear plane preferably has a configuration such that its tilt angle with respect to the light exit plane decreases from the light entrance planes toward the center of the light guide plate or toward a position where the light guide plate is thickest. With the tilt angle of the rear plane gradually decreasing, light having less luminance unevenness can be emitted through the light exit plane.

Second Embodiment

Figure 13A:
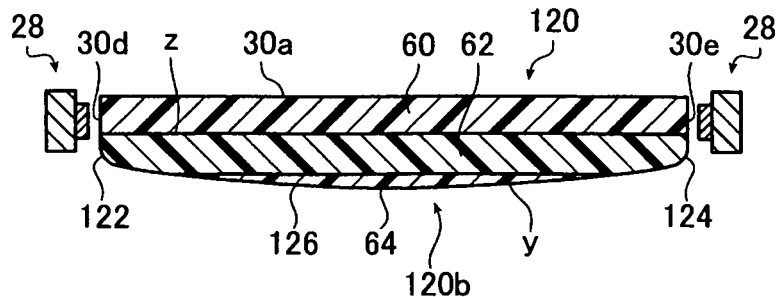
FIG. 13A is a cross sectional view schematically illustrating a planar lighting device using the light guide plate according to a second embodiment of the invention.

FIG. 13A is a cross-sectional view schematically illustrating a backlight unit using the light guide plate according to the second embodiment of the invention.

A light guide plate 120 illustrated in FIG. 13A has a rear plane 120$b$ composed of a first curved plane 122 and a second curved plane 124 connecting with the first light entrance plane 30$d$ and the second light entrance plane 30$e$, respectively, and a third curved plane 126 connecting with the first curved plane 122 and the second curved plane 124. The rear plane 120$b$ is parallel to the light entrance planes 30$d$, 30$e$ and symmetrical to a central axis or the bisector a bisecting the light exit plane 30$a$.

The first curved plane 122 and the second curved plane 124 are curved lines each formed by a part of an ellipse in a cross section normal to the longitudinal direction of the light entrance planes 30$d$, 30$e$; the third curved plane 126 is a curved plane defined by a curved line formed by a part of a circle. The first light entrance plane 30$d$ and the second light entrance plane 30$e$ connect smoothly with the first curved plane 122 and the second curved plane 124, respectively; the first curved plane 122 and the second curved plane 124 connect smoothly with the third curved plane 126.

The interface z is positioned so that its ends are contained in the light entrance planes 30$d$, 30$e$; the interface y is positioned so that its ends are contained in the third curved plane 126.

Third Embodiment

Figure 13B:
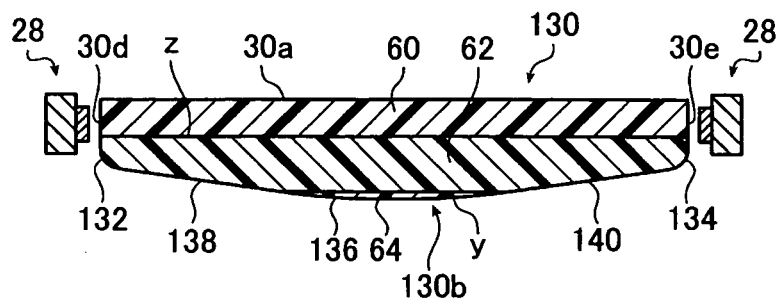
FIG. 13B is a cross sectional view schematically illustrating a planar lighting device using the light guide plate according to a third embodiment of the invention.

FIG. 13B is a sectional view schematically illustrating a backlight unit using the light guide plate according to a third embodiment of the invention.

A light guide plate 130 illustrated in FIG. 13B has a rear plane 130$b$ composed of a first curved plane 132 and a second curved plane 134 connecting with the first light entrance plane 30$d$ and the second light entrance plane 30$e$, respectively; a first inclined plane 138 and a second inclined plane 140 connecting with the first curved plane 132 and the second curved plane 134; and a curved portion 136 connecting with the first inclined plane 138 and the second inclined plane 140. The rear plane 130$b$ is symmetrical to a plane passing through the bisector α and normal to the light exit plane 30$a$.

The first curved plane 132 and the second curved plane 134 are curved lines formed by a part of an ellipse in a cross section normal to the longitudinal direction of the light entrance planes 30$d$, 30$e$; the curved portion 136 represents a curve line defined by a part of a circle. These planes connect smoothly with each other.

The interface z is positioned so that its ends are contained in the light entrance planes 30$d$, 30$e$; the interface y is formed at the ends of the first inclined plane 138 and the second inclined plane 140 closer to the curved portion 136.

Even when the rear plane is not formed of the inclined planes and the curved portion like the light guide plate 30 illustrated in FIG. 3, a density distribution can be achieved where the combined particle density of the scattering particles in the direction normal to the light exit plane increases with the increasing distance from the light entrance planes by forming the light guide plate as described above such that the distance from the light exit plane increases with the increasing distance from the light entrance planes and that the light guide plate is essentially composed of the first layer located closer to the light exit plane, the second layer having a higher particle density than the first layer, and the third layer located closer to the rear plane and having a higher particle density than the second layer. The convex luminance distribution can be achieved and the light use efficiency can be increased by kneading and dispersing the scattering particles into the light guide plate so that the combined particle density of the scattering particles in the direction normal to the light exit plane increases with the increasing distance from the light entrance planes.

Further, even where the rear side is modified in various manners, the positions of the interface z and interface y normal to the light exit plane are not limited to the above, provided that the light guide plate has a three-layer structure, the first layer, the second layer, and the third layer in this order, the first layer being the closest to the light exit plane.

The convex luminance distribution can be achieved and the light use efficiency can be increased even when the rear plane of the light guide plane is not so configured that the distance from the light exit plane increases with the increasing distance from the light entrance planes, provided that the combined particle density of the scattering particles in the direction normal to the light exit plane increases with the increasing distance from the light entrance planes. However, kneading and dispersing the scattering particles into a flat light guide plate so that the particle density has a distribution is difficult and increases the manufacturing costs.

Thus, the light guide plate can be easily given a distribution of the combined particle density wherein the combined particle density of the scattering particles in the direction normal to the light exit plane increases with the increasing distance from the light entrance planes by configuring the light guide plane such that the distance from the light exit plane increases with the increasing distance from the light entrance planes and that the light guide plate is essentially composed of the first layer located closer to the light exit plane, the second layer having a higher particle density than the first layer, and the third layer located closer to the rear plane and having a higher particle density than the second layer.

Further, the rear plane of the light guide plane permits various configurations, provide that the distance from the light exit plane increases with the increasing distance from the light entrance planes. Thus, one may use a combination of the shape of the rear plane of the light guide plate and the position of the interfaces z and y to obtain a more preferable distribution of the combined particle density in the direction normal to the light exit plane and, hence, a more preferable luminance distribution, which increases the light use efficiency.

Thus, the combined particle density in a direction normal to the light exit plane can be given a distribution wherein the particle density increases with the increasing distance from the light entrance planes by configuring the light guide plate such that the distance of the rear plane from the light exit plane increases with the increasing distance from the light entrance planes and that the light guide plate has a three-layer configuration composed of the first layer located closer to the light exit plane, the second layer having a higher particle density than the first layer, and the third layer located closer to the rear plane and having a higher particle density than the second layer. Thus, a convex luminance distribution can be obtained and the light use efficiency can be improved.

Further, although the rear plane according to the embodiment has a configuration such that its distance from the light exit plane increases with the increasing distance from the light entrance planes, the configuration of the rear plane is not limited this way and may include a flat plane located between two planes growing increasingly distant from the light exit plane with the increasing distance from the light entrance planes and connecting these two planes in the middle between the two light entrance planes.

A configuration having the central portion of the rear side formed of a flat plane allows the light guide plate to settle snugly in the housing and thus ensures improved fastening to the housing. This permits reduction of fastening members such as support members used to install and fasten the light guide plate in the housing and thus reduction of manufacturing costs.

Fourth Embodiment

Figure 14A:
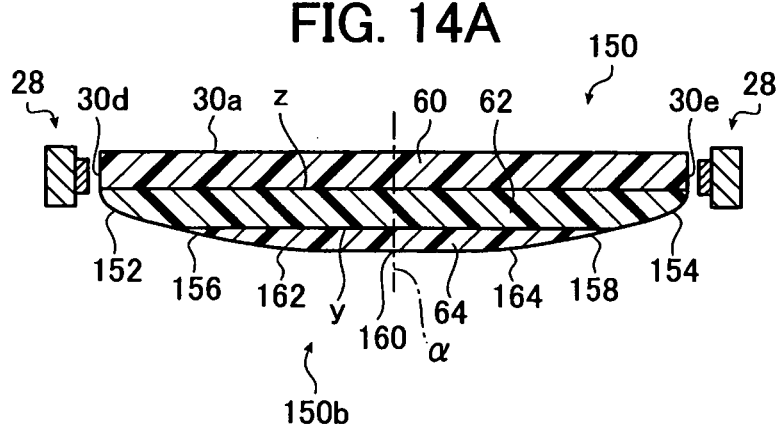
FIG. 14A is a cross-sectional view schematically illustrating a light guide plate according to a fourth embodiment of the invention.

FIG. 14A is a cross sectional view schematically illustrating a backlight unit using a light guide plate according to a fourth embodiment of the invention.

A light guide plate 150 illustrated in FIG. 14A has a rear plane 150$b$ composed of a first curved plane 152 and a second curved plane 154 connected with the first light entrance plane 30$d$ and the second light entrance plane 30$e$, respectively; a first inclined plane 156 and a second inclined plane 158 connected with the first curved plane 152 and the second curved plane 154, respectively; a third curved plane 162 and a fourth curved plane 164 connected with the first inclined plane 156 and the second inclined plane 158, respectively; and a flat plane 160 connected with the third curved plane 162 and the fourth curved plane 164. The rear plane 150$b$ is symmetrical to a plane passing through the bisector $\alpha$ and perpendicular to the light exit plane 30$a$.

The first curved plane 152 and the second curved plane 154 represent curves defined by a part of an ellipse, and the third curved plane 162 and the fourth curved plane 164 represent curves defined by a part of a circle, in a cross section perpendicular to the longitudinal direction of the light entrance planes 30$d$ and 30$e$. The flat plane 160 is parallel to the light exit plane 30$a$. These planes connect smoothly with each other.

The interface z is positioned so that its ends are contained in the light entrance planes 30$d$ and 30$e$; the interface y is positioned so that its ends are contained in the first inclined plane 156 and the second inclined plane 158.

Figure 14B:
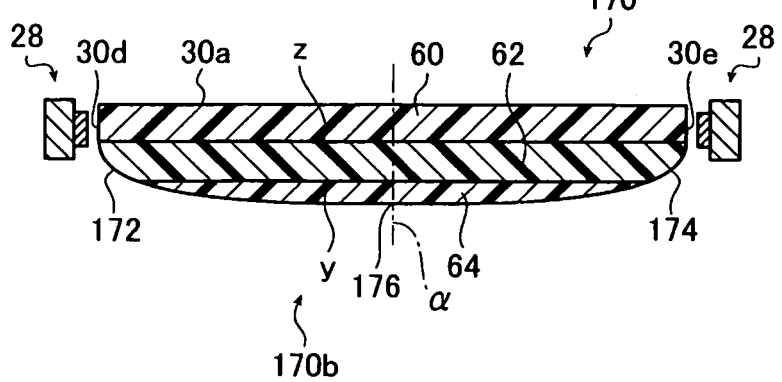
FIG. 14B is a cross-sectional view schematically illustrating a light guide plate according to a variation of the fourth embodiment.

FIG. 14B is a cross sectional view schematically illustrating a backlight unit using a light guide plate according to a variation of the fourth embodiment of the invention.

A light guide plate 170 illustrated in FIG. 14B has a rear plane 170$b$ composed of a first curved plane 172 and a second curved plane 174 connected with the first light entrance plane 30$d$ and the second light entrance plane 30$e$, respectively, and a flat plane 172 connected with the first curved plane 172 and the second curved plane 174. The rear plane 170$b$ is symmetrical with respect to a plane passing through the bisector $\alpha$ and perpendicular to the light exit plane 30$a$.

The first curved plane 172 and the second curved plane 174 represent curves defined by a part of an ellipse in a cross section perpendicular to the longitudinal direction of the light entrance planes 30$d$ and 30$e$. The flat plane 176 is parallel to the light exit plane 30$a$. These planes connect smoothly with each other.

The interface z is positioned so that its ends are contained in the light entrance planes 30$d$ and 30$e$; the interface y is positioned so that its ends are contained in the first curved plane 172 and the second curved plane 174.

Thus, the combined particle density distribution in the direction normal to the light exit plane can be adjusted so that the particle density increases with the increasing distance from the light entrance planes even where the light guide plate has a flat portion on its rear side so that the light guide plate settles snugly in the housing by the configuration of the rear plane of the light guide plate comprising two planes growing increasingly distant from the light exit plane with the increasing distance from the light entrance planes and a flat plane connecting these two planes and the configuration of the light guide plate comprising three layers of which those closer to the rear side have higher densities. Thus, the light guide plate can emit light having a convex luminance distribution, and the light use efficiency can be improved. Further, the configuration having a flat central portion on the rear side of the right guide plate permits an improved fastening of the light guide plate to the housing, and this permits reduction of fastening members used to install and fasten the light guide plate in the housing and hence reduction of manufacturing costs.

The rear plane of the light guide plane permits various configurations, provided that the rear plane comprises two planes growing increasingly distant from the light exit plane with the increasing distance from the light entrance planes and a flat plane connecting these two planes. For example, the first to fourth curved planes are not limited to curves defined by a part of a circle or an ellipse in a cross section perpendicular to the longitudinal direction of the light entrance planes; they may be a quadratic curve or a curve expressed by a third or more powered polynomial or a curve formed by a combination thereof.

Even where the central portion of the rear plane is flat, the interface y between the second and the third layers is preferably located in a position such that its ends meet the planes that are inclined with respect to the light exit plane and more preferably in a position such that its ends meet the joints between planes (excluding those with the flat plane). This prevents a sudden change of the luminance distribution of the exiting light and curbs the decrease of the luminance of the exiting light.

Although the light guide plate according to the first to the fourth embodiments is formed so that the layers have an increasingly high particle density as their position approaches the rear plane from the light exit plane, the particle densities of the respective layers need not necessarily be determined in such a manner or according to the order the layers are disposed. More specifically, a particle density $Np_i$ of the i-th layer (i is an integer not less than two and not greater than n) counted from the light exit plane may satisfy $Np_i < Np_{i-1}$; for example, the second layer may have a higher particle density than the third layer. In this case, suppose that the particle density of the scattering particles varies among n layers (n is an integer greater than 2) and let $Np_n$ be the particle density of the scattering particles in the nth layer from the light exit plane. Then, it is preferable that the first layer has the lowest particle density $Np_1$, and that the particle density $Np_i$ of the scattering particles in the i-th layer from the light exit plane (i is an integer greater than 1 and not greater than n) satisfies $Np_1 < Np_i < 2 \cdot Np_n$. With the first layer having a low particle density, the light entering through the light entrance planes can be guided deep into the light guide plate. With the first layer having the low particle density $Np_1$, the light entering through the light entrance planes can be guided deep into the light guide plate. Suppose that the particle density of the scattering particles varies among n layers (n is an integer greater than 2) and let $Np_n$ be the particle density of the scattering particles in the nth layer from the light exit plane, a smooth bell curve light amount distribution can be achieved when the particle density $Np_i$ is adapted to satisfy $Np_1 < Np_i < 2 \cdot Np_n$.

With the light guide plate comprising a plurality of layers having different particle densities, the distribution of the combined particle density can be varied in the direction normal to the light exit plane and, hence, light can be emitted through the light exit plane with a desired luminance distribution.

By varying the luminance distribution of the light emitted through the light exit plane of the light guide plate, the light guide plate or the backlight unit using the light guide plate can be used for a wider variety of applications and in a broader application range including, for example, a display board employing ornamental lighting (illuminations).

With the light guide plate given a multiple-layer structure having different particle densities, the light use efficiency and the convexness ratio can be increased so that the light guide plate can be formed into a film having a thickness of 1 mm or less, a flexibility, and a less weight than a normal light guide plate. Accordingly, the light guide plate can be attached to a ceiling, mounted to a cylindrical pole so as to contour the peripheral surface thereof, and otherwise used in a flexible manner for a wider variety of applications and in a wider application range including ornamental lighting (illumination) and POP (point-of-purchase) advertising.

While the inventive planar lighting device has been described above in detail, the invention is not limited in any manner to the above first to third embodiments, and various improvements and modifications may be made without departing from the spirit of the present invention. While the inventive planar lighting device has been described above in detail, the invention is not limited in any manner to the above embodiments and various improvements and modifications may be made without departing from the spirit of the present invention.

For example, the light guide plate may be fabricated by mixing a plasticizer into a transparent resin.

Fabricating the light guide plate from a material thus prepared by mixing a transparent material and a plasticizer provides a flexible light guide plate, allowing the light guide plate to be deformed into various shapes. Accordingly, the surface of the light guide plate can be formed into various curved planes.

With the light guide plate given such flexibility, the light guide plate or the planar lighting device using the light guide plate can even be mounted to a wall having a curvature when used, for example, for a display board employing ornamental lighting (illuminations). Accordingly, the light guide plate can be used for a wider variety of applications and in a wider application range including ornamental lighting and POP (point-of-purchase) advertising.

Said plasticizer is exemplified by phthalic acid esters, or, specifically, dimethyl phthalate (DMP), diethyl phthalate (DEP), dibutyl phthalate (DBP), di(2-ethylhexyl) phthalate (DOP (DEHP)), di-n-octyl phthalate (DnOP), diisononyl phthalate (DINP), dinonyl phthalate (DNP), diisodecyl phthalate (DIDP), phthalate mixed-base ester (C6 to C11) (610P, 711P, etc.) and butyl benzyl phthalate (BBP). Besides phthalic acid esters, said plasticizer is also exemplified by dioctyl adipate (DOA), diisononyl adipate (DINA), dinormal alkyl adipate ($C_{6,8,10}$) (610A), dialkyl adipate ($C_{7,9}$) (79A), dioctyl azelate (DOZ), dibutyl sebacate (DBS), dioctyl sebacate (DOS), tricresyl phosphate (TCP), tributyl acetylcitrate (ATBC), epoxidized soybean oil (ESBO), trioctyl trimellitate (TOTM), polyesters, and chlorinated paraffins.

Although the light guide plate according to the above first to fourth embodiments is of a type comprising two light sources disposed adjacent two light entrance planes to admit light through both sides of the light guide plate, the invention is not limited to such a configuration; the light guide plate may be of a type comprising a single light source disposed adjacent one light entrance plane to admit light through one side of the light guide plate. Reduction in number of light sources permits reduction in number of component parts and hence in manufacturing costs.

Alternatively, light sources may be also provided opposite the shorter sides of the light exit plane of the light guide plate in addition to the two light sources. Increasing the number of light sources permits enhancing the intensity of light emitted by the light guide plate.

The light guide plate has a rear plane that is axisymmetrical with respect to the bisector a connecting the centers of the shorter sides and which has a reversed-wedge shape such that the rear plane is inclined so that the light guide plate grows thicker in a direction normal to the light exit plane from the light entrance planes to the center of the light guide plate but is not limited to such a configuration. The light guide plate according to the invention may have any of the shapes as appropriate used for various backlight units. For example, the light guide plate may have a wedge-shape such that the rear plane is inclined so that the light guide plate grows thinner with the increasing distance from the light entrance planes. Alternatively, the light guide plate may have an asymmetrical, reversed wedge shape such that it has a single light entrance plane and the rear plane is inclined so that the light guide plate is thickest in a position closer to the light entrance plane than to the bisector of the light exit plane.

What is claimed is:

1. A light guide plate comprising a rectangular light exit plan, two light entrance planes respectively connected with the light exit plane at two opposite sides of the light exit plane and a rear plane including two symmetrical planes provided on a side opposite from the light exit plane, a distance of the two symmetrical planes from the light exit plane increasing from the two light entrance planes toward a center of the light exit plane, wherein the light guide plate comprises three structural layers disposed on each other in a direction normal to the light exit plane, each of at least two or more of the structural layers containing scattering particles dispersed therein, the structural layers having different particle densities of scattering particles, wherein a relationship $Np_1 < Np_2 < Np_3$ holds, where $Np_1$ is a particle density of scattering particles of a first structural layer from the light exit plane, and $Np_2$ is a particle density of scattering particles of a second structural layer from the light exit plane, $Np_3$ is a particle density of scattering particles of a third structural layer from the light exit plane, and wherein the two symmetrical planes are connected with each other through a flat portion parallel to the light exit plane.

2. The light guide plate according to claim 1, wherein the particle densities of the scattering particles satisfy $0$ wt $\% < Np_1 \leq 0.15$ wt $\%$ and $0.008$ wt $\% < Np_2 < Np_3 < 0.4$ wt $\%$.

3. The light guide plate according to claim 1, wherein the particle densities of the scattering particles satisfy $Np_1 = 0$ and $0.015$ wt $\% < Np_2 < Np_3 < 0.75$ wt $\%$.

4. The light guide plate according to claim 1, wherein interfaces between two structural layers adjacent to each other of the three structural layers having the different particle densities of the scattering particles are planes parallel to the light exit plane.

5. The light guide plate according to claim 1, wherein the two symmetrical planes each comprises an inclined plane inclined with respect to the light exit plane.

6. The light guide plate according to claim 1, wherein the two symmetrical planes are each formed of a curved plane.

7. The light guide plate according to claim 1, wherein the curved plane is represented by at least one of a part of a quadratic curve and a curve expressed by a third or more powered polynomial in a cross section normal to a longitudinal direction of one of the two light entrance planes.

8. The light guide plate according to claim 1, wherein the rear plane has a contour comprising two curved lines each defined by a part of an ellipse and respectively connected with the two light entrance planes, two straight lines connected with the two curved lines, and a curved line defined by a part of a circle and joining the two straight lines in a cross section normal to a longitudinal direction of one of the two light entrance planes.

9. The light guide plate according to claim 1, wherein the light exit plane comprises a pair of longer sides and a pair of shorter sides, two light entrance planes meeting the longer sides of the light exit plane, respectively.

10. The light guide plate according to claim 1, wherein the rear plane is comprised of two or more inclined planes inclined with respect to the light exit plane and at least one curved planes, and wherein the interface between the second structural layer and the third structural layer is located in a position such that its ends meet the joints between the inclined plane and the curved plane.

* * * * *